(12) United States Patent
Cho et al.

(10) Patent No.: US 10,003,284 B2
(45) Date of Patent: Jun. 19, 2018

(54) POWER APPARATUS, CONTROLLING METHOD THEREOF AND MOTOR DRIVING APPARATUS THEREIN

(71) Applicants: SAMSUNG ELECTRONICS CO., LTD., Suwon-si, Gyeonggi-do (KR); SNU R&DB FOUNDATION, Seoul (KR)

(72) Inventors: Je Hyung Cho, Seoul (KR); Alexey Bodrov, Suwon-si (KR); Yongjae Lee, Seosan-si (KR); Jung-Ik Ha, Seoul (KR)

(73) Assignees: SAMSUNG ELECTRONICS CO., LTD., Suwon-si (KR); SNU R&DB FOUNDATION, Seoul (KR)

( * ) Notice: Subject to any disclaimer, the term of this patent is extended or adjusted under 35 U.S.C. 154(b) by 11 days.

(21) Appl. No.: 14/618,046

(22) Filed: Feb. 10, 2015

(65) Prior Publication Data

US 2015/0229245 A1   Aug. 13, 2015

(30) Foreign Application Priority Data

Feb. 11, 2014   (KR) .................. 10-2014-0015704

(51) Int. Cl.
*H02P 5/46* (2006.01)
*H02P 1/54* (2006.01)
(Continued)

(52) U.S. Cl.
CPC ............... *H02P 5/50* (2013.01); *H02P 21/18* (2016.02); *H02P 21/22* (2016.02); *H02P 31/00* (2013.01); *H02P 2205/07* (2013.01)

(58) Field of Classification Search
CPC .................. G03G 15/04; G05B 19/19
(Continued)

(56) References Cited

U.S. PATENT DOCUMENTS 5,929,575 A * 7/1999 Hyodo .................. G03G 15/04
                                                              318/69
6,043,617 A   3/2000 Matsumoto et al.
(Continued)

OTHER PUBLICATIONS

Bidart D et al: "Mono inverter dual parallel PMSM—structure and control strategy" Industrial Electronics, 2008. IECON 2008. 34th Annual Conference of IEEE, IEEE, Piscataway, NJ, USA, Nov. 10, 2008 (Nov. 10, 2008), pp. 268-273, XP031825431.*
(Continued)

*Primary Examiner* — Jorge L Carrasquillo
*Assistant Examiner* — Cortez Cook
(74) *Attorney, Agent, or Firm* — Staas & Halsey LLP

(57) ABSTRACT

Disclosed herein is a power apparatus including a first motor, a second motor connected with the first motor in parallel, a driver configured to supply driving currents to the first and second motors, a current detector configured to detect the driving current of the first motor and the driving current of the second motor, a speed calculator configured to calculate a rotating speed of the first motor and a rotating speed of the second motor, and a controller configured to control the driver based on the rotating speed of the first motor, wherein the controller controls the driver so that the rotating speed of the first motor and the rotating speed of the second motor are the same as each other, when the rotating speed of the first motor and the rotating speed of the second motor are different from each other.

20 Claims, 17 Drawing Sheets

(51) Int. Cl.
*H02P 5/50* (2016.01)
*H02P 21/22* (2016.01)
*H02P 21/18* (2016.01)
*H02P 31/00* (2006.01)

(58) Field of Classification Search
USPC .............................................. 318/112, 227
See application file for complete search history.

(56) References Cited

U.S. PATENT DOCUMENTS

2001/0028228 A1* 10/2001 Toyozawa .............. G05B 19/19
318/34
2009/0167234 A1* 7/2009 Uechi ..................... H02P 29/68
318/800

OTHER PUBLICATIONS

Nguyen et al: "Predictive Torque Control—A solution for mono inverter-dual parallel PMSM system" Industrial Electronics (ISIE), 2011 IEEE International Symposium on, IEEE, Jun. 27, 2011 (Jun. 27, 2011), pp. 697-702, XP032019150.*
Kawai H et al: "Characteristics of Speed Sensorless Vector Controlled Dual Induction Motor Drive Connected in Parallel Fed by a Single Inverter" IEEE Transactions on Industry Applications, IEEE Service Center, Piscataway, NJ, US.*
Bidart D et al., "Mono inverter dual parallel PMSM-structure and control strategy" Industrial Electronics. 2008. IECON 2008., 34th Annual Conference of IEEE. IEEE., Piscataway. NJ. USA. Nov. 10, 2008, pp. 268-273.
Ngoc Linh Nguyen et al: "Predictive Torque Control—A solution for mono inverter-dual parallel PMSM system" Industrial Electronics (ISIE). 2011 IEEE, International Symposium on. IEEE. Jun. 27, 2011 (Jun. 27, 2011). pp. 697-702.
Kawai H et al., "Characteristics of Speed Sensorless Vector controlled Dual Induction Motor Drive connected in Parallel Fed by a Single Inverter", IEEE Transactions on Industry Applications. IEEE Service Center. Piscataway. NJ. US., vol. 40, No. 1, Jan. 1, 2004 (Jan. 1, 2004). pp. 153-161.
European Search Report dated Jun. 29, 2015 issued in corresponding European Patent Application 15154691.8.

* cited by examiner

POWER APPARATUS, CONTROLLING METHOD THEREOF AND MOTOR DRIVING APPARATUS THEREIN

CROSS-REFERENCE TO RELATED APPLICATIONS

This application claims the benefit of Korean Patent Application No. 10-2014-0015704, filed on Feb. 11, 2014 in the Korean Intellectual Property Office, the disclosure of which is incorporated herein by reference.

BACKGROUND

1. Field

One or more embodiments of the present disclosure relate to a power apparatus, a controlling method thereof and a motor driving apparatus therein, and more particularly, to a power apparatus which drives a plurality of motors at the same time, a controlling method thereof and a motor driving apparatus therein.

2. Description of the Related Art

Motors are widely used not only in home appliances such as washing machines, refrigerators, air-conditioners and vacuum cleaners, but also in electric vehicles and hybrid vehicles, which have recently been receiving attention.

Among them, a permanent magnet motor using a permanent magnet rotates a rotor using a magnetic interaction between a magnetic field of a coil through which an electric current flows and a magnetic field of the permanent magnet.

To drive the permanent magnet motor, a driving apparatus, such as an inverter, which is capable of applying a driving voltage is required. Since the magnetic field generated by the rotor of the permanent magnet motor is determined depending on a location of the rotor, the inverter should apply the driving voltage in consideration of the location of the rotor.

Eventually, in the driving voltage, a phase of the driving voltage is changed according to a rotating speed of the permanent magnet motor, an output torque and the location of the rotor.

As described above, to control the permanent magnet motor, the inverter should apply the driving voltage which is changed according to the rotating speed of the permanent magnet motor, the output torque and the location of the rotor. Therefore, to control two or more permanent magnet motors, two or more inverters that control the motors, respectively, are required.

SUMMARY

Therefore, it is an aspect of the present disclosure to provide a power apparatus which controls two or more motors using a single inverter, a controlling method thereof and a motor driving apparatus therein.

Additional aspects of the disclosure will be set forth in part in the description which follows and, in part, will be obvious from the description, or may be learned by practice of the disclosure.

In accordance with an aspect of the present disclosure, a power apparatus includes a first motor, a second motor connected in parallel with the first motor, a driver configured to supply driving currents to the first and second motors, a speed calculator configured to calculate a rotating speed of the first motor and a rotating speed of the second motor, and a controller configured to control the driver based on the rotating speed of the first motor, wherein the controller controls the driver so that the rotating speed of the first motor and the rotating speed of the second motor are the same as each other when the rotating speed of the first motor and the rotating speed of the second motor are different from each other.

The controller may control the driver to supply a first driving current when the rotating speed of the first motor and the rotating speed of the second motor are the same as each other, and may control the driver to supply a second driving current when the rotating speed of the first motor and the rotating speed of the second motor are different from each other.

The first driving current may be calculated based on the driving current of the first motor and the rotating speed of the first motor.

The second driving current may be calculated based on the rotating speed of the first motor and a difference between the rotating speed of the first motor and the rotating speed of the second motor.

The second driving current may be calculated based on the rotating speed of the first motor, the driving current of the first motor and the driving current of the second motor so as to minimize a power loss.

Each of the first and second motors may have a rotor including a permanent magnet.

Each driving current supplied to the first and second motors may include a d axis current in parallel with a magnetic field formed by the permanent magnet and a q axis current vertical to the magnetic field formed by the permanent magnet.

The controller may calculate a q axis current command of the first motor based on the rotating speed of the first motor.

The controller may calculate a d axis current command of the first motor based on a difference between a location of the rotor of the first motor and a location of the rotor of the second motor and a difference between the rotating speed of the first motor and the rotating speed of the second motor.

The controller may generate a d axis current command of the first motor based on a difference between a location of the rotor of the first motor and a location of the rotor of the second motor, a difference between the rotating speed of the first motor and the rotating speed of the second motor, the rotating speed of the first motor, the q axis and d axis currents of the first motor, and the q axis and d axis currents of the second motor.

In accordance with another aspect of the present disclosure, a method of controlling a power apparatus comprising a first motor and a second motor connected in parallel with each other includes detecting a driving current of the first motor and a driving current of the second motor, calculating a rotating speed of the first motor and a rotating speed of the second motor, supplying the driving currents to the first and second motors based on the rotating speed of the first motor, and supplying changed driving currents according to a difference between the rotating speed of the first motor and the rotating speed of the second motor when the rotating speed of the first motor and the rotating speed of the second motor are different from each other.

The supplying of the changed driving currents may include supplying a first driving current when the rotating speed of the first motor and the rotating speed of the second motor are the same as each other, and supplying a second driving current when the rotating speed of the first motor and the rotating speed of the second motor are different from each other.

The supplying of the changed driving currents may include calculating the changed driving currents based on the driving current of the first motor and the rotating speed of the first motor.

The supplying of the changed driving currents may include calculating the changed driving currents based on the difference between the rotating speed of the first motor and the rotating speed of the second motor, and the driving current of the first motor.

The supplying of the changed driving currents may include calculating the changed driving currents based on the rotating speed of the first motor, the driving current of the first motor and the driving current of the second motor so as to minimize a power loss.

In accordance with still another aspect of the present disclosure, a motor driving apparatus includes a driver configured to supply driving currents to first and second motor connected in parallel with each other, a current detector configured to detect the driving current of the first motor and the driving motor of the second motor, a speed calculator configured to calculate a rotating speed of the first motor and a rotating speed of the second motor, and a controller configured to control the driver based on the driving current and the rotating speed of the first motor, wherein the controller controls the driver so that the rotating speed of the first motor and the rotating speed of the second motor are the same as each other when the rotating speed of the first motor and the rotating speed of the second motor are different from each other.

The controller may control the driver to supply a first driving current when the rotating speed of the first motor and the rotating speed of the second motor are the same as each other, and may control the driver to supply a second driving current when the rotating speed of the first motor and the rotating speed of the second motor are different from each other.

The first driving current may be calculated based on the driving current of the first motor and the rotating speed of the first motor.

The second driving current may be calculated based on a difference between the rotating speed of the first motor and the rotating speed of the second motor.

The second driving current may be calculated based on the rotating speed and the driving current of the first motor so as to minimize a power loss.

In accordance with an aspect of the present disclosure, a motor driving apparatus includes a first motor, a second motor, a driver to supply driving currents to both the first and second motors, a speed calculator to calculate a rotating speed of the first motor and a rotating speed of the second motor, and a controller to equalize the rotating speed of the first motor and the rotating speed of the second motor by controlling the driving currents supplied by the driver.

The controller may control the driver based on locations of rotors included in the first and second motors.

The motor driving apparatus may also include first and second location detectors to detect locations of rotors included in the first and second motors and first and second current detectors to detect the driving currents to the first and second motors. Also, the controller may control the driver based on the locations of rotors detected by the first and second location detectors and the first and the driving currents detected by the first and second current detectors.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

The description proposed herein is just an example for the purpose of illustrations only, not intended to limit the scope of the disclosure, so it should be understood that other equivalents and modifications could be made thereto without departing from the spirit and scope of the disclosure.

Hereinafter, a power apparatus, a controlling method thereof and a motor driving apparatus therein according to an embodiment of the present disclosure will be described in detail with reference to the accompanying drawings.

Figure 1:
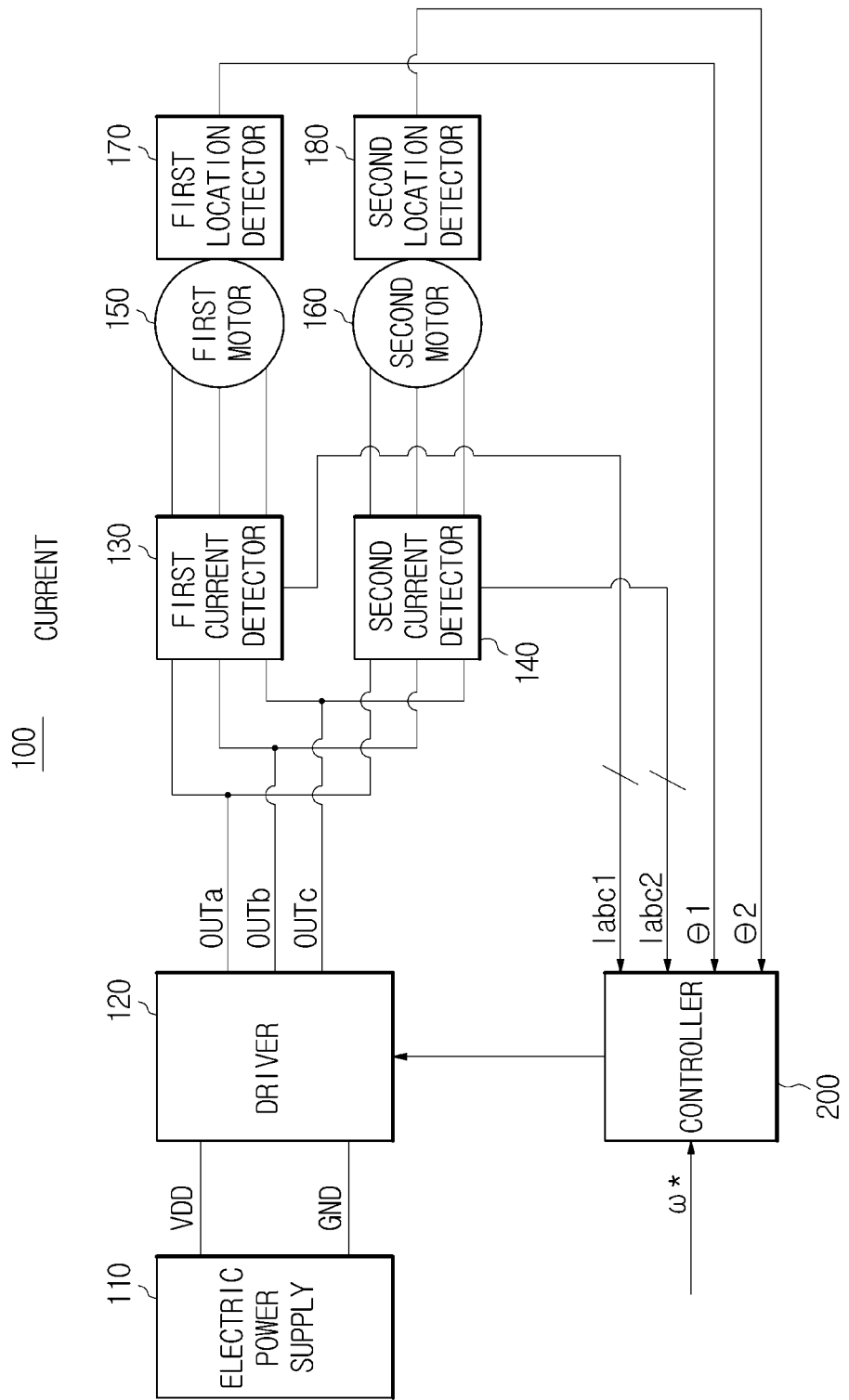
FIG. 1 is a view illustrating a power apparatus according to an embodiment of the present disclosure.
Figure 2:
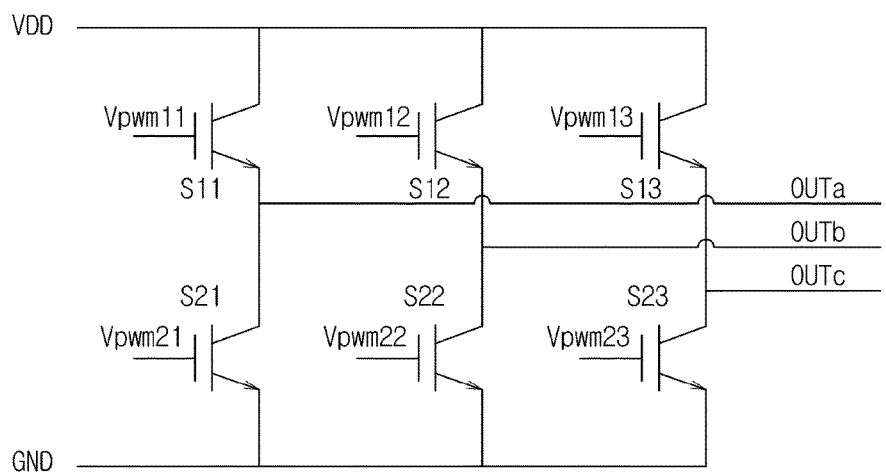
FIG. 2 is a view illustrating an example of a driver included in the power apparatus according to an embodiment of the present disclosure.

FIG. 1 is a view illustrating a power apparatus according to an embodiment, and FIG. 2 is a view illustrating an example of a driver included in the power apparatus according to an embodiment of the present disclosure.

As illustrated in FIGS. 1 and 2, the power apparatus 100 may include, for example, an electric power supply 110, a driver 120, first and second motors 150 and 160, first and second current detectors 130 and 140, first and second location detectors 170 and 180 and a controller 200. The power apparatus 100 receives electric energy such as AC or DC power from an outside and converts the electric energy into kinetic energy.

The electric power supply 110 supplies DC power to the driver 120. For example, when the power apparatus 100 receives AC power from an external power source, the electric power supply 110 may include a rectifier circuit such as a diode bridge, and a smoothing circuit such as a capacitor. Further, the electric power supply 110 may selectively further include a power factor correction (PFC) circuit which improves a power factor of input power, and a DC-DC convertor which converts a voltage of the DC power rectified by the rectifier circuit.

As another example, when the power apparatus 100 receives DC power from the external power source, the electric power supply 110 may include a DC-DC convertor which converts a voltage of the supplied DC power.

The driver 120 supplies a driving current to the first and second motors 150 and 160 using the DC power such as $V_{DD}$ received from the electric power supply 110. Specifically, the driver 120 opens and closes a plurality of switching circuits disposed between the electric power supply 110 and the first and second motors 150 and 160 according to control signals VPWM generated from the controller 200, and thus applies a proper driving voltage to the first and second motors 150 and 160. At this time, a driving current is supplied to the first and second motors 150 and 160 according to the applied driving voltage.

For example, the driver 120 may include an inverter as illustrated in FIG. 2. The inverter may include three upper switching circuits S11 to S13 connected in parallel with each other, and three lower switching circuits S21 to S23 connected in parallel with each other.

Also, the three upper switching circuits S11 to S13 and the three lower switching circuits S21 to S23 are connected in series with each other, respectively, and nodes connecting the three upper switching circuits S11 to S13 with the three lower switching circuits S21 to S23, respectively, are connected with an a-phase output OUTa, a b-phase output OUTb and a c-phase output OUTc, respectively.

Also, the plurality of switching circuits S11, S12 and S13 (S11 to S13) and S21, S22, and S23 (S21 to S23) are opened and closed by receiving the control signals VPWM, i.e., VPWM11, VPWM12, and VPWM13 and VPWM21, VPWM22, and VPWM23 generated by the controller 200.

The switching circuits S11 to S13 and S21 to S23 as described above may employ an insulated gage bipolar transistor (IGBT) or a power field effect transistor (power FET) used to break or pass high voltage and current.

However, the driver 120 is not limited to the general inverter as illustrated in FIG. 2, and may include various types of inverters. For example, the driver 120 may include a multi-level inverter such as a neural point champed (NPC) inverter.

The first and second motors 150 and 160 receive the driving current from the driver 120 and generate the kinetic energy. Specifically, the first and second motors 150 and 160 rotate a rotor using a magnetic interaction between the rotor including a permanent magnet and a stator including a coil.

For example, the first and second motors 150 and 160 may employ a 3-phase synchronous motor. A stator of the 3-phase synchronous motor receives a 3-phase driving current having an a-phase, a b-phase and a c-phase and generates a rotating magnetic field, and the 3-phase synchronous motor rotates a rotor by an interaction between a magnetic field generated by the rotor and the rotating magnetic field of the stator.

The first and second current detectors 130 and 140 detect a first driving current Iabc1 supplied to the first motor 150 and a second driving current Iabc2 supplied to the second motor 160, respectively.

Also, the first and second current detectors 130 and 140 may respectively include at least two current sensors. For example, the first current detector 130 may include an a-phase current sensor detecting an a-phase current supplied to an a-phase input terminal of the first motor 150, and a b-phase current sensor detecting a b-phase current supplied to a b-phase input terminal of the first motor 150. When the first current detector 130 detects an a-phase current and a b-phase current, the controller 200 (to be described later) may calculate a c-phase current based on the a-phase current and the b-phase current.

Of course, the first current detector 130 may include the b-phase current sensor detecting the b-phase current and the c-phase current sensor detecting the c-phase current, or may include the c-phase current sensor detecting the c-phase current and the a-phase current sensor detecting the a-phase current.

Generally, the driving current supplied to the motor is a high current of a few amperes (A) to a few hundred amperes (A). To detect such a high current, at least two current sensors included in the first and second current detectors 130 and 140 may include a current transformer (CT) which proportionally reduces an intensity of the driving current, and an ampere meter which detects an intensity of the proportionally reduced current. In other words, the current sensors may calculate the driving current by reducing the intensity of the driving current using the current transformer (CT) and then measuring the intensity of the reduced current.

An example in which the first and second current detectors 130 and 140 includes the current sensor having the current transformer (CT) and the current meter is illustrated, but the present disclosure is not limited thereto. The first and second current detectors 130 and 140 may include a hall sensor or a current sensor including a shunt resistor.

The first and second location detectors 170 and 180 detect locations θ1 and θ2 of the rotors included in the first and second motors 150 and 160, respectively. Specifically, the first location detector 170 detects the location θ1 of the rotor included in the first motor 150, and the second location detector 180 detects the location θ2 of the rotor included in the second motor 160.

For example, the first and second location detectors 170 and 180 may include hall sensors detecting the magnetic fields generated by the rotors included in the first and second motors 150 and 160, respectively. The hall sensor is arranged at a proper location of the rotor included in each of the first and second motors 150 and 160, detects a change in the magnetic field according to rotation of the rotor, and detects the location of the rotor based on the detected magnetic field.

In another example, the first and second location detectors 170 and 180 may include encoders detecting the rotation of the rotors included in the first and second motors 150 and 160, respectively. The encoders may output pulse-shaped signals according to the rotation of the rotors, and may detect rotational displacements or rotating speeds of the rotors based on a period of the pulses and the number of the pulses.

In still another example, the first and second location detectors 170 and 180 may include resolvers detecting the rotation of the rotors included in the first and second motors 150 and 160, respectively. The resolvers may output sine waves according to the rotation of the rotors, and may detect the rotational displacements or the rotating speeds of the rotors based on a period of the sine waves and the number of the sine waves.

In yet another example, the first and second location detectors 170 and 180 may calculate the locations θ1 and θ2 of the rotors included in the first and second motors 150 and 160 based on the first and second driving currents Iabc1 and Iabc2 detected by the first and second current detectors 130 and 140, respectively. When the locations θ1 and θ2 of the rotors included in the first and second motors 150 and 160 are calculated based on the first and second driving currents Iabc1 and Iabc2, the first and second location detectors 170 and 180 may be connected with the first and second current detectors 130 and 140, respectively, unlike FIG. 1.

The controller 200 generates the control signals VPWM controlling the driver 120 based on the locations θ1 and θ2 of the rotors included in the first and second motors 150 and 160, which are detected by the first and second location detectors 170 and 180, and the first and second driving currents Iabc1 and Iabc2 detected by the first and second current detectors 130 and 140.

Specifically, the controller 200 calculates a current command to be supplied to the first and second motors 150 and 160, based on the rotating speeds of the first and second motors 150 and 160 and the first and second driving currents Iabc1 and Iabc2, and calculates a voltage command to be supplied to the first and second motors 150 and 160, depending on the current command. Then, the controller 200 performs pulse width modulation (PWM) on the voltage command for the first and second motors 150 and 160, and generates the control signals VPWM.

The control signals VPWM output from the controller 200 turn on or off the plurality of switching circuits S11 to S13 and S21 to S23 included in the driver 120. Further, the driver 120 may apply the driving voltage corresponding to the voltage command to the first and second motors 150 and 160 and also may apply the first and second driving currents Iabc1 and Iabc2 corresponding to the current command to the first and second motors 150 and 160 according to a rate of a turned-on time, i.e., a duty rate of the plurality of switching circuits S11 to S13 and S21 to S23.

Further, when the load of the first motor 150 is the same as the load of the second motor 160, the controller 200 controls the first and second motors 150 and 160 based on the rotating speed and the driving current of one of the first and second motors 150 and 160. For example, the controller 200 generates the current command and the voltage command based on the rotating speed ω1 and first driving current Iabc1 of the first motor 150, and generates the control signals VPWM according to the generated voltage command.

If the load of the first motor 150 and the load of the second motor 160 are different from each other, the controller 200 generates a compensation current command based on a difference between the rotating speed of the first motor 150 and the rotating speed of the second motor 160. Here, the compensation current command compensates for the current command so that the rotating speed ω1 of the first motor 150 and the rotating speed ω2 of the second motor 160 can be adjusted to be the same as each other or similar to each other.

The specific structure and operation of the controller 200 will be described below in detail.

The controller 200 may include one or two or more micro-processors which perform calculation according to a given program and data, and one or two or more memories which store the program and the data.

Although not illustrated in FIGS. 1 and 2, the power apparatus 100 may include a gate driver which generates a gate drive signal turning on or off the plurality of switching circuits S11 to S13 and S21 to S23 included in the driver 120 according to the control signals VPWM output from the controller 200.

Generally, the micro-processor included in the controller 200 is a logic circuit having a driving voltage of 3.3 V to 5V, but the driver 120 includes the inverter having a driving voltage of 300V or more.

For example, when the electric power supply 110 rectifies an AC power of 220V and generates a DC power, a DC power of about 310V is supplied to the driver 120. That is, a high voltage of 310V is applied to both ends of each of the plurality of switching circuits S11 to S13 and S21 to S23 includes in the driver 120. The power switching circuit (e.g., the IGBT, the power FET or the like) which breaks or passes the high voltage of 310V generally uses a signal having a voltage of 15V or more as the gate signal turning on or off a switch.

Due to a difference between the output voltage (3.3V to 5V) of the controller 200 and the input voltage (15V or more) of the driver 120, the gate driver converts the control signals VPWM (3.3V to 5V) output from the controller 200 into a gate drive signal corresponding to the input voltage (15V or more) of the driver 120. In other words, the gate driver raises the voltage of the control signal VPWM and generates the gate drive signal.

The structure of the power apparatus 100 according to an embodiment has been described above.

Hereinafter, the operation of the power apparatus 100 according to an embodiment, particularly, the operation of the controller 200 will be described.

The controller 200 of the power apparatus 100 according to an embodiment converts the a-phase, the b-phase and the c-phase of the first and second motors 150 and 160 into a d axis and a q axis, and controls operations of the first and second motors 150 and 160. Specifically, the controller 200 converts the a-phase, b-phase and c-phase currents of the first and second motors 150 and 160 into the d axis and q axis currents, and also converts the a-phase, b-phase and c-phase voltages of the first and second motors 150 and 160 into the d axis and q axis voltages.

Here, the d axis is an axis of a direction which coincides with directions of the magnetic fields generated by the rotors of the first and second motors 150 and 160, and the q axis is an axis of a direction which is 90 degrees ahead in the directions of the magnetic fields generated by the rotors. Here, 90 degrees is not a mechanical angle of the rotor, but an electrical angle in which an angle between adjacent N poles or an angle between adjacent S poles included in the rotor is converted into 360 degrees.

The d axis voltage Vd, q axis voltage Vq, the d axis current Id and q axis current Iq satisfy a relationship similar to the following Equation 1.

$$\begin{bmatrix} V_{dk} \\ V_{qk} \end{bmatrix} = \begin{bmatrix} R_S & -\omega_r L_S \\ \omega_r L_S & R_S \end{bmatrix} \begin{bmatrix} I_{dk} \\ I_{qk} \end{bmatrix} + \begin{bmatrix} 0 \\ \omega_r \lambda_f \end{bmatrix} \quad \text{[Equation 1]}$$

(wherein $V_{dk}$ is the d axis voltage of a k-th motor, $V_{qk}$ is the q axis voltage of the k-th motor, $R_S$ is resistance of a coil included in the stator, Ls is inductance of the coil included in the stator, λf is a magnetic flux of a permanent magnet included in the rotor, ωr is the rotating speed of the rotator, Idk is the d axis current of the k-th motor, and Iqk is the q axis current of the k-th motor.)

At this time, when the resistances of the coils included in the rotors of the first and second motors 150 and 160 are ignored, a torque Te of each of the first and second motors 150 and 160 is expressed by the following Equation 2.

$$T_e = \frac{3}{2}\frac{P}{2}\lambda_f I_{qk} = -\frac{3}{2}\frac{P}{2}\frac{\lambda_f}{L_S}\frac{V_{dk}}{\omega_r}$$ [Equation 2]

(wherein Te is the torque of the motor, P is the number of poles of the rotor, λf is the magnetic flux of the permanent magnet included in the stator, Ls is the inductance of the coil included in the stator, ωr is the rotating speed of the rotator, and Iqk is the q axis current of the k-th motor.)

According to Equation 2, the torque Te of each of the first and second motors 150 and 160 depends on the q axis current Iqk. Therefore, when the loads of the first and second motors 150 and 160 are the same as each other, and the first and second motors 150 and 160 rotates at the same speed, the controller 200 receives the q axis current Iqk according to the loads of the first and second motors 150 and 160, and controls the a-phase, b-phase and c-phase driving voltages so that the d axis current Idk becomes "0".

Figure 3:
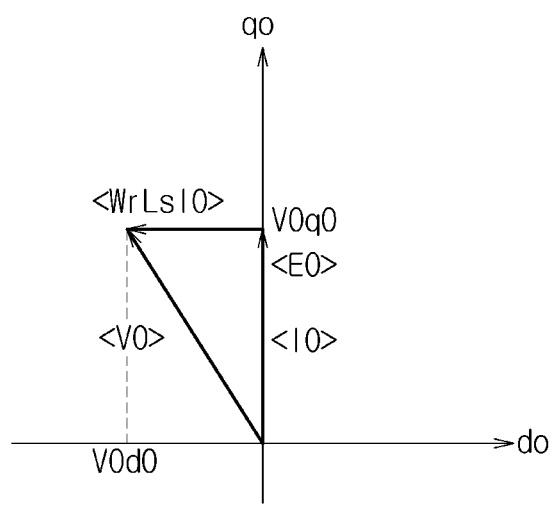
FIG. 3 is a view illustrating a d-q axis current and a d-q axis voltage when a load of a first motor and a load of a second motor included in the power apparatus coincide with each other.

FIG. 3 is a view illustrating a d-q axis current and a d-q axis voltage when the load of the first motor and the load of the second motor in the power apparatus according to an embodiment coincide with each other.

Referring to FIG. 3, when the load of the first motor 150 and the load of the second motor 160 coincide with each other, a d1 axis-q1 axis of the first motor 150 coincides with a d2 axis-q2 axis of the second motor 160. (Hereinafter, when the d1 axis-q1 axis of the first motor 150 coincides with the d2 axis-q2 axis of the second motor 160, it will be referred to as a "d0 axis-q0 axis".)

Further, when the load of the first motor 150 and the load of the second motor 160 coincide with each other, the controller 200 may control the driver 120 so that a dq axis current I0 in a direction which coincides with a q0 axis is supplied to the first and second motors 150 and 160, as illustrated in FIG. 3. That is, the controller 200 may control the driver 120 so that a d0 axis current of "0" and a q0 axis current of "I0q0" are supplied to the first and second motors 150 and 160, respectively.

A dq axis voltage to be applied to the first and second motors 150 and 160 so that the dq axis current I0 is supplied will be described.

First, a counter electromotive force E0 due to the rotating speed ωr of the rotor and the magnetic flux λf of the rotor is generated in a direction which coincides with the q0 axis, and a voltage drop ωr*Ls*I0 due to the coil of the stator is generated in a direction vertical to the dq axis current I0. That is, the voltage drop ωr*Ls*I0 due to the coil of the stator is generated in a direction of the d0 axis.

To supply the dq axis current I0 to the first and second motors 150 and 160, a dq axis voltage V0 corresponding to a vector sum of the voltage drop ωr*Ls*I0 due to the coil of the stator and the counter electromotive force E0 should be applied to the first and second motors 150 and 160. That is, as illustrated in FIG. 3, a d0 axis voltage of "V0d0" and a q0 axis voltage of "V0q0" should be applied to the first and second motors 150 and 160.

In brief, when the load of the first motor 150 and the load of the second motor 160 coincide with each other, the controller 200 controls the driver 120 so that the voltage of "V0d0" and the q0 axis voltage of "V0q0" are applied to the first and second motors 150 and 160, as illustrated in FIG. 3. As a result, the d0 axis current of "0" and the q0 axis current of "I0q0" are supplied to the first and second motors 150 and 160.

As described above, when the load of the first motor 150 and the load of the second motor 160 coincide with each other, the d1 axis-q1 axis of the first motor 150 coincides with the d2 axis-q2 axis of the second motor 160, and thus the controller 200 may control the first and second motors 150 and 160 based on the driving current and the rotating speed of the first motor 150.

Specifically, the controller 200 converts the a-phase, b-phase and c-phase currents supplied to the first motor 150 into the dq axis currents, and generates a dq axis current command to be supplied to the first motor 150, based on the converted dq axis currents and the rotating speed of the first motor 150.

Then, the controller 200 generates a dq axis voltage command to be applied to the first motor 150, based on the dq axis current command, and converts the dq axis voltage command into a-phase, b-phase and c-phase voltages to output the a-phase, b-phase and c-phase voltages. At this time, the first motor 150 and the second motor 160 are connected in parallel with each other, and the a-phase, b-phase and c-phase voltages applied to the first motor 150 are also applied to the second motor 160.

Also, since the load of the first motor 150 and the load of the second motor 160 are the same as each other, the a-phase, b-phase and c-phase currents supplied to the first motor 150 are the same as the a-phase, b-phase and c-phase currents supplied to the second motor 160.

However, when the load of the first motor 150 and the load of the second motor 160 are different from each other due to disturbance or the like, the rotating speed of the first motor 150 and the rotating speed of the second motor 160 are different from each other, and the location θ1 of the rotor in the first motor 150 and the location θ2 of the rotor in the second motor 160 are different from each other. As a result, the d1 axis-q1 axis of the first motor 150 and the d2 axis-q2 axis of the second motor 160 are different from each other.

Figure 4:
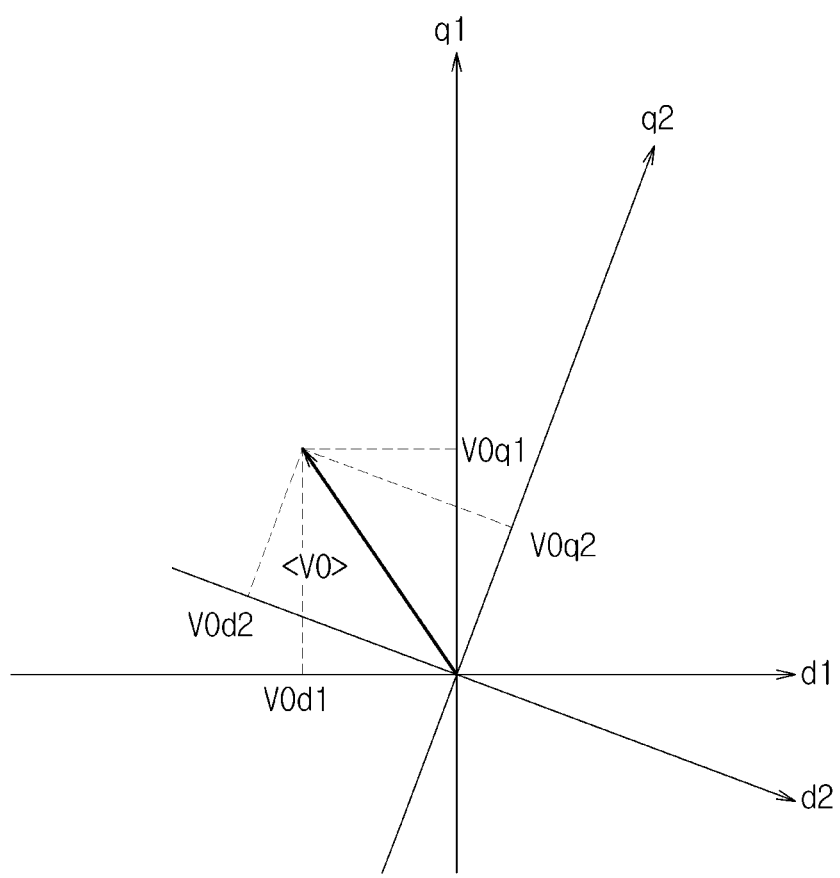
FIG. 4 is a view illustrating a d axis-q axis voltage applied to the first and second motors when the load of the first motor and the load of the second motor in the power apparatus are different from each other.

FIG. 4 is a view illustrating the dq axis voltage applied to the first and second motors when the load of the first motor and the load of the second motor included in the power apparatus according to an embodiment are different from each other.

Referring to FIG. 4, when the load of the first motor 150 and the load of the second motor 160 are different from each other, the d1 axis-q1 axis of the first motor 150 and the d2 axis-q2 axis of the second motor 160 are dislocated from each other.

When, while the d1 axis-q1 axis of the first motor 150 and the d2 axis-q2 axis of the second motor 160 are dislocated from each other, the dq axis voltage V0 is applied to the first and second motors 150 and 160, a d1 axis voltage of "V0d1" and a q1 axis voltage of "V0q1" are applied to the first motor 150, and a d2 axis voltage of "V0d2" and a q2 axis voltage of "V0q2" are applied to the second motor 160.

As described above, since the d1 axis voltage and the q1 axis voltage applied to the first motor 150 and the d2 axis voltage and the q2 axis voltage applied to the second motor 160 are different from each other, the first driving current Iabc1 supplied to the first motor 150 and the second driving current Iabc2 supplied to the second motor 160 become different from each other.

In other words, when the load of the first motor 150 and the load of the second motor 160 are different from each other, the controller 200 may not control the second motor 160 any longer, based on the driving current and the rotating speed of the first motor 150.

As described above, when the load of the first motor 150 and the load of the second motor 160 are different from each other, the controller 200 may change a d1 axis current Id1 of the first motor 150 to change an output torque of the second motor 160 without change in an output torque of the first motor 150. Further, the controller 200 may change a q1 axis voltage Vq1 to change the d1 axis current.

According to Equation 2, since the output torque Te of the motor depends on the q axis current Iqk of the motor and the d axis voltage Vdk, the output torque of the first motor 150 is not affected even when the d1 axis current Id1 and the q1 axis voltage Vq1 of the first motor 150 are changed.

As described above, the controller 200 may consistently fix the q1 axis current and the d1 axis voltage of the first motor 150 to consistently maintain the output torque of the first motor 150, and may change the d1 axis current and the q1 axis voltage of the first motor 150 to change the output torque of the second motor 160.

Since the d1 axis-q1 axis of the first motor 150 and the d2 axis-q2 axis of the second motor 160 are dislocated from each other, when the d1 axis current of the first motor 150 is changed, the q2 axis current as well as the d2 axis current of the second motor 160 are changed, and the output torque of the second motor 160 is also changed due to the change in the q2 axis current.

In brief, the output torque of the second motor 160 may be changed by changing the d1 axis current and the q1 axis voltage of the first motor 150.

Further, the rotating speed of the second motor 160 may be fed back to the controller 200, and the controller 200 may control the d1 axis current of the first motor 150 so that a difference between the rotating speed of the first motor 150 and the rotating speed of the second motor 160 is "0".

Figure 5:
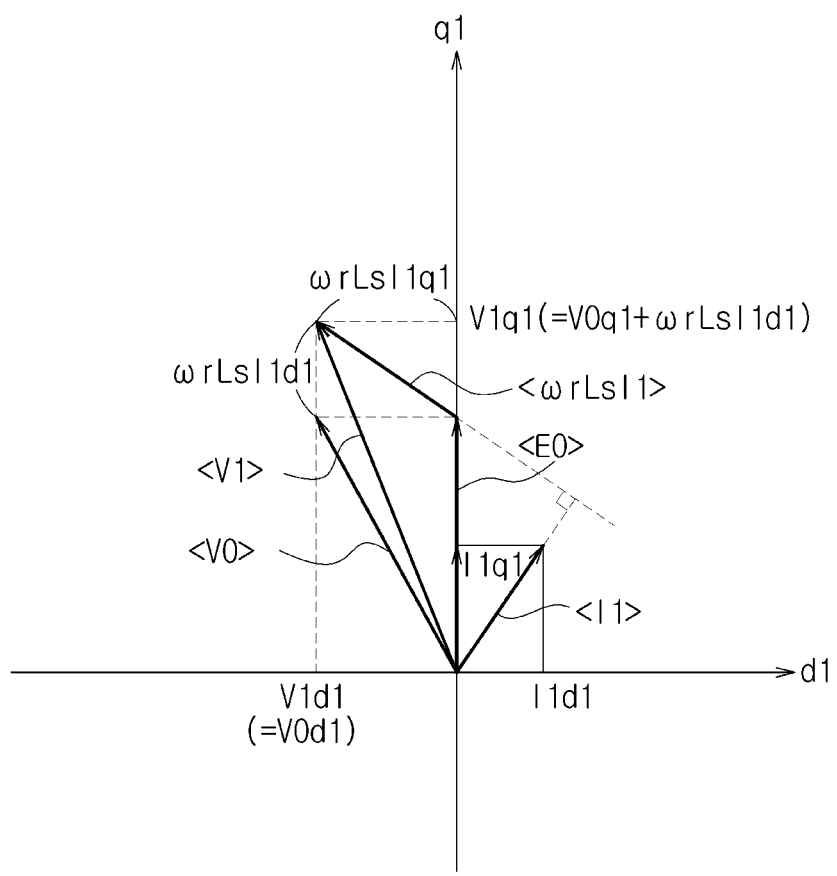
FIGS. 5, 6, and 7 are views illustrating an example in which the power apparatus according to an embodiment of the present disclosure increases a d1 axis current of the first motor.
Figure 6:
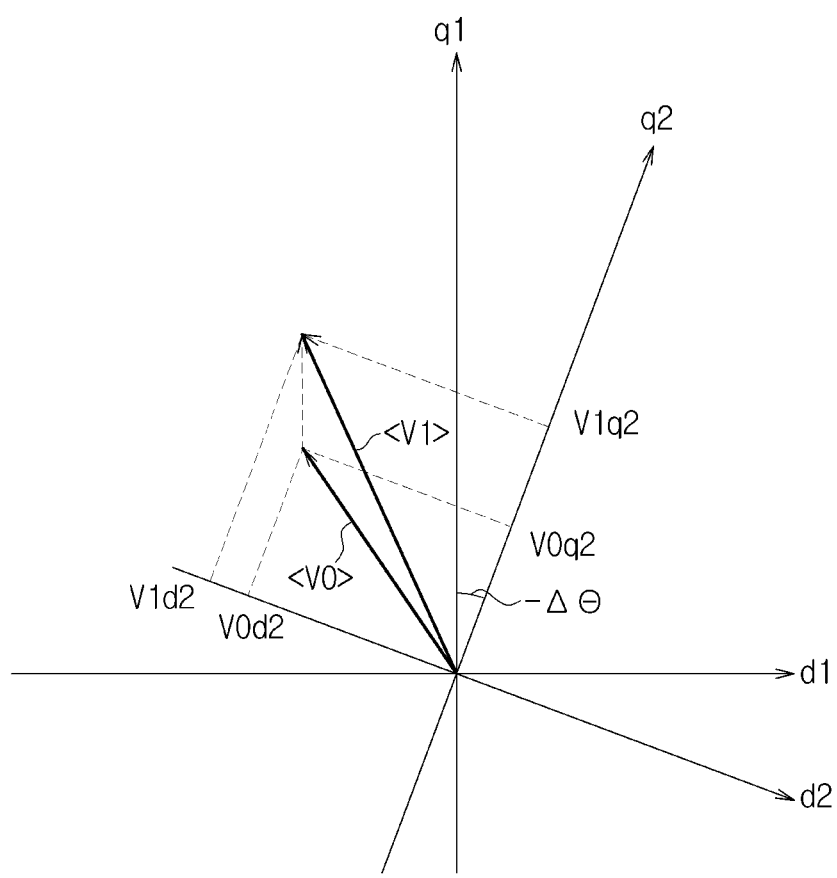
Figure 7:
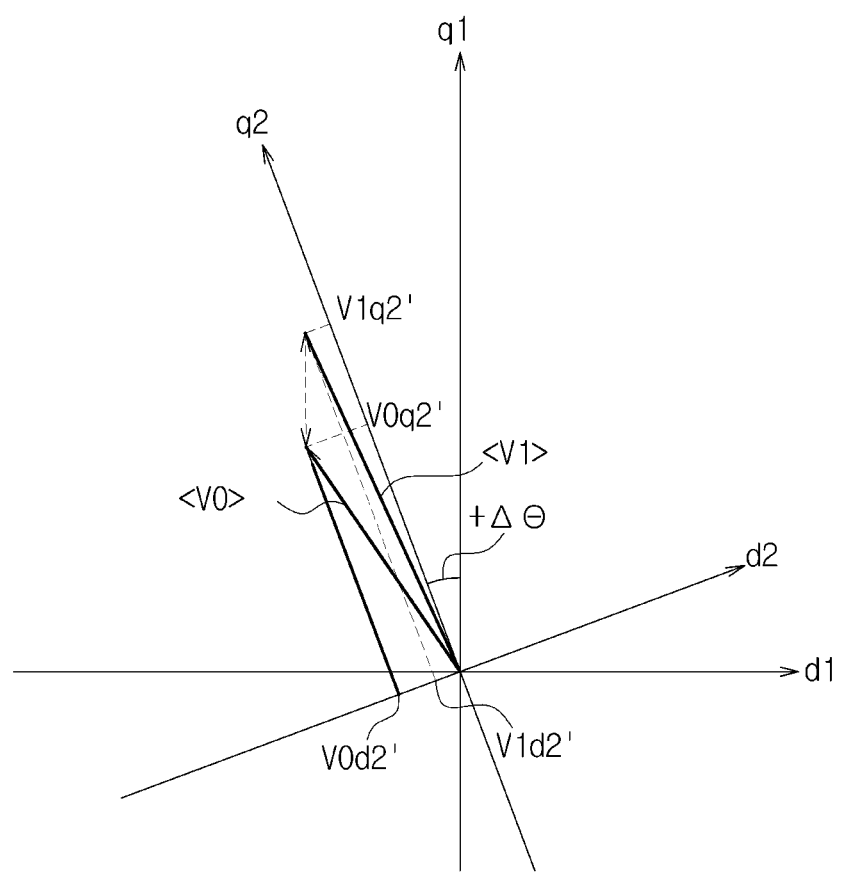

FIGS. 5 to 7 are views illustrating an example in which the power apparatus according to an embodiment of the present disclosure increases the d1 axis current of the first motor.

For example, as illustrated in FIG. 5, the controller 200 may add a positive d1 axis current "I1d1" to the initial d1 axis current I0 so that the dq axis current I1 is supplied to the first motor 150.

To this end, the controller 200 may control the driver 120 so that the dq axis voltage V1 corresponding to the vector sum of the voltage drop ωr*Ls*I0 due to the coil and the counter electromotive force E0 is applied to the first and second motors 150 and 160. In other words, the controller 200 may control the driver 120 so that the d1 axis voltage of "V0d1(=V1d1)" and the q1 axis voltage of "V0q1+ωr*Ls*I1d1(=V1q1)" are applied to the first and second motors 150 and 160.

When the load of the first motor 150 or the second motor 160 is changed, and the rotating speed of the first motor 150 and the rotating speed of the second motor 160 are different from each other, the d1 axis-q1 axis of the first motor 150 and the d2 axis-q2 axis of the second motor 160 may be different from each other by "−Δθ" or "+Δθ", as illustrated in FIGS. 6 and 7.

In the case in which the d1 axis-q1 axis of the first motor 150 and the d2 axis-q2 axis of the second motor 160 are different from each other by "−Δθ", when the dq axis voltage applied to the second motor 160 is changed from V0 to V1, the d2 axis voltage applied to the second motor 160 is increased from "V0d2" to "V1d2" as illustrated in FIG. 6, and the q2 axis voltage is increased from "V0q2" to "V1q2". Further, since the d2 axis voltage of the second motor 160 is increased, the q2 axis current is increased, and the output torque of the second motor 160 is increased due the increase in the d2 axis current.

In other words, when the d1 axis-q1 axis of the first motor 150 is located ahead of the d2 axis-q2 axis of the second motor 160 in a rotating direction, the output of the second motor 160 may be increased by increasing the d axis current of the first motor 150.

In the case in which the d1 axis-q1 axis of the first motor 150 and the d2 axis-q2 axis of the second motor 160 are different from each other by "+Δθ", when the dq axis voltage applied to the second motor 160 is changed from V0 to V1, the d2 axis voltage applied to the second motor 160 is reduced from "V0d2" to "V1d2" as illustrated in FIG. 7, and the q2 axis voltage is increased from "V0q2" to "V1q2". Further, since the d2 axis voltage of the second motor 160 is reduced, the q2 axis current is reduced, and the output torque of the second motor 160 is reduced due the reduction in the d2 axis current.

In other words, when the d1 axis-q1 axis of the first motor 150 is located behind the d2 axis-q2 axis of the second motor 160 in the rotating direction, the output of the second motor 160 may be reduced by increasing the d axis current of the first motor 150.

Figure 8:
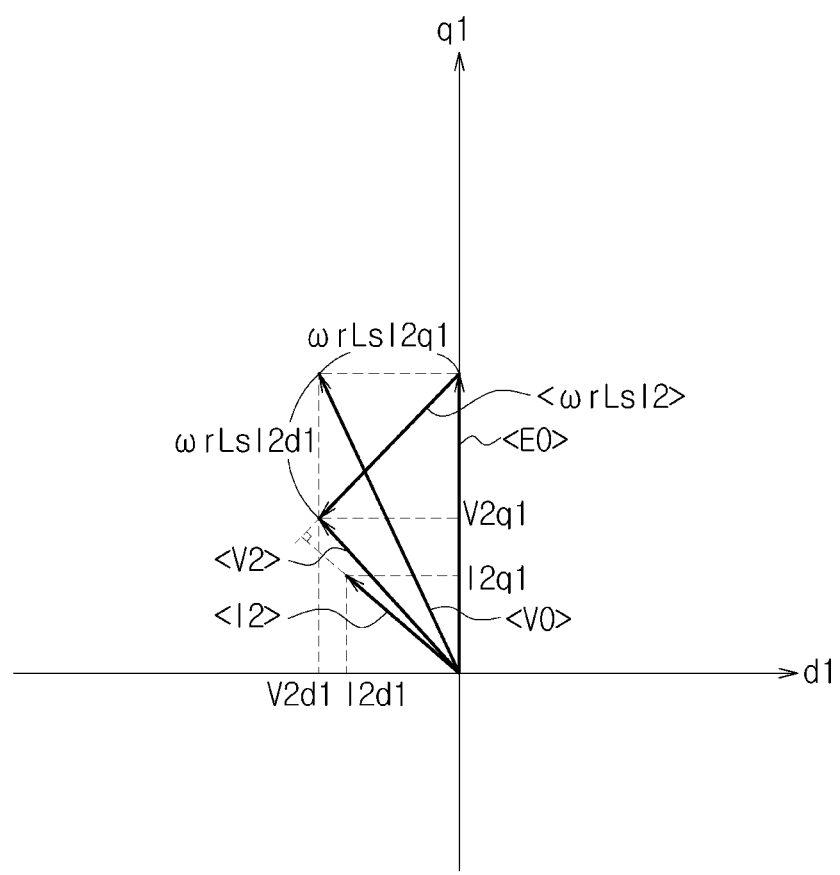
FIGS. 8, 9, and 10 are views illustrating an example in which the power apparatus according to an embodiment of the present disclosure reduces the d1 axis current of the first motor.
Figure 9:
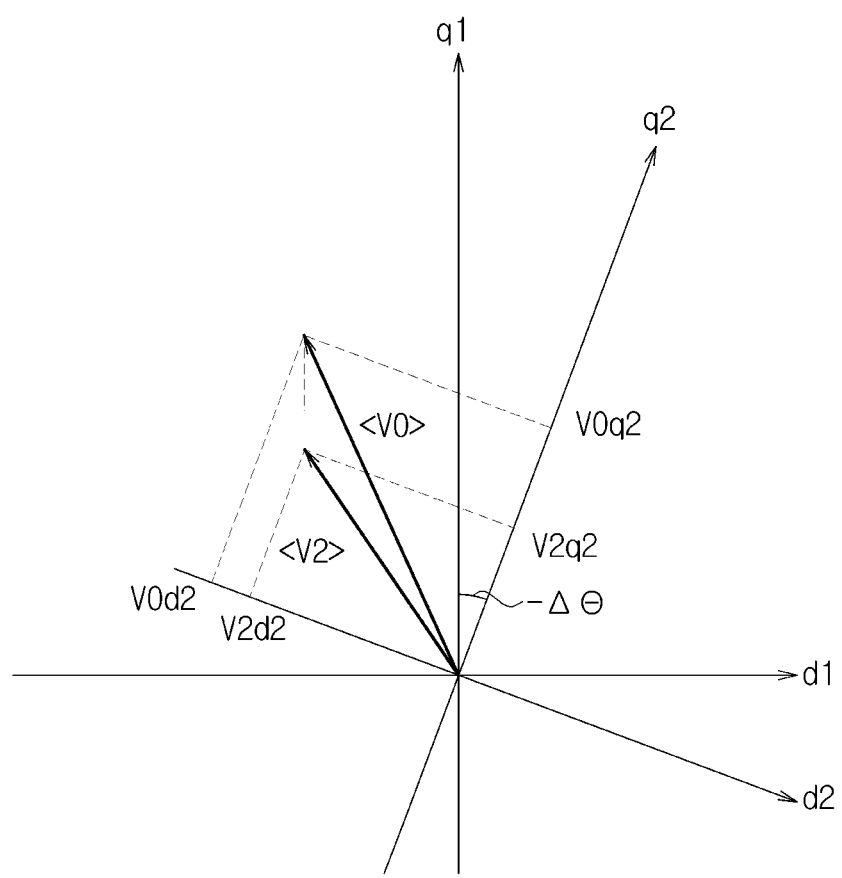
Figure 10:
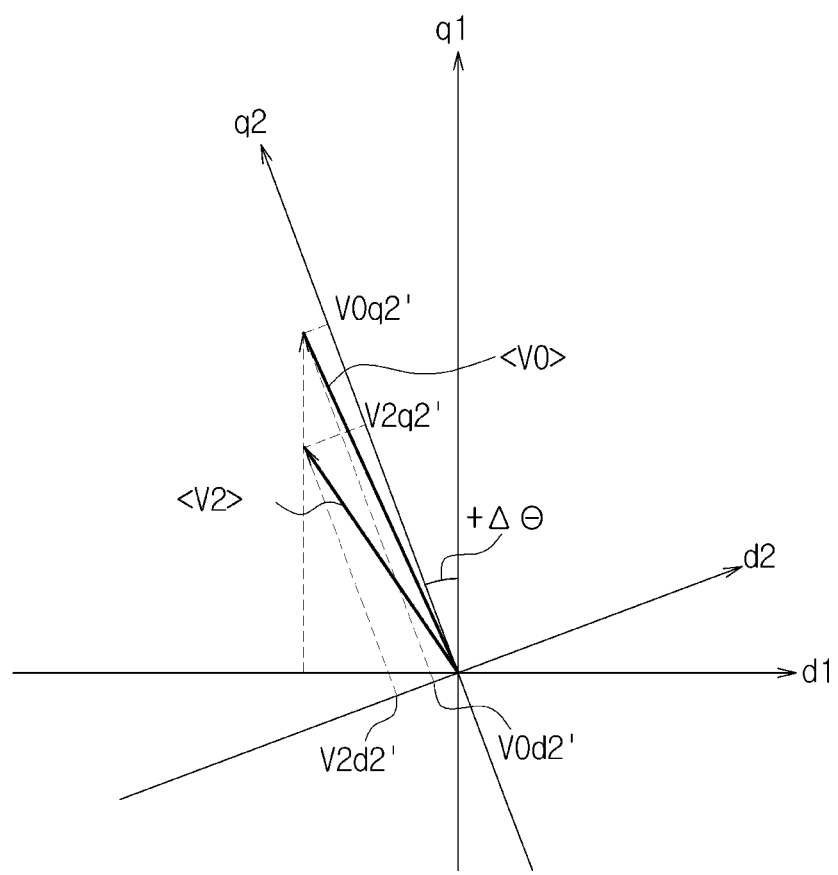

FIGS. 8 to 10 are views illustrating an example in which the power apparatus according to an embodiment of the present disclosure reduces the d1 axis current of the first motor.

In another example, as illustrated in FIG. 8, the controller 200 may add a negative d1 axis current "I2d1" to the initial d1 axis current I0 so that the dq axis current I2 is supplied to the first motor 150.

To this end, the controller 200 may control the driver 120 so that the dq axis voltage V2 corresponding to the vector sum of the voltage drop ωr*Ls*I2 due to the coil and the counter electromotive force E0 is applied to the first and second motors 150 and 160. In other words, the controller 200 may control the driver 120 so that the d1 axis voltage of "V0d1(=V2d1)" and the q1 axis voltage of "V0q1+ωr*Ls*I2d1(=V2q1)" are applied to the first and second motors 150 and 160.

When the load of the first motor 150 or the second motor 160 is changed, and the rotating speed of the first motor 150 and the rotating speed of the second motor 160 are different from each other, the d1 axis-q1 axis of the first motor 150 and the d2 axis-q2 axis of the second motor 160 may be different from each other by "−Δθ" or "+Δθ", as illustrated in FIGS. 9 and 10.

In the case in which the d1 axis-q1 axis of the first motor 150 and the d2 axis-q2 axis of the second motor 160 are different from each other by "−Δθ", when the dq axis voltage applied to the second motor 160 is changed from V0 to V2, the d2 axis voltage applied to the second motor 160 is reduced from "V0d2" to "V2d2" as illustrated in FIG. 9, and the q2 axis voltage is reduced from "V0q2" to "V2q2". Further, since the d2 axis voltage of the second motor 160 is reduced, the q2 axis current is reduced, and the output torque of the second motor 160 is reduced due the reduction in the d2 axis current.

In other words, in the case in which the d1 axis-q1 axis of the first motor 150 is located ahead of the d2 axis-q2 axis of the second motor 160 in a rotating direction, the output of the second motor 160 may be reduced when the d axis current of the first motor 150 is reduced.

In the case in which the d1 axis-q1 axis of the first motor 150 and the d2 axis-q2 axis of the second motor 160 are different from each other by "+Δθ", when the dq axis voltage applied to the second motor 160 is changed from V0 to V2, the d2 axis voltage applied to the second motor 160 is increased from "V0d2" to "V2d2" as illustrated in FIG. 10, and the q2 axis voltage is reduced from "V0q2" to "V2q2". Further, since the d2 axis voltage of the second motor 160 is increased, the q2 axis current is also increased, and the output torque of the second motor 160 is increased due to the increase in the d2 axis current.

In other words, when the d1 axis-q1 axis of the first motor 150 is located behind the d2 axis-q2 axis of the second motor 160 in the rotating direction, the output of the second motor 160 may be increased when the d axis current of the first motor 150 is reduced.

As a result, when the rotating speeds of the first and second motors 150 and 160 in the controller 200 are different from each other, the controller 200 may increase or reduce the output torque of the second motor 160 by increasing or reducing the d1 axis current of the first motor 150 according to the locations of the rotators of the first and second motors 150 and 160.

In other words, when the rotating speed of the second motor 160 is faster than the rotating speed of the first motor 150, the controller 200 may change the d1 axis current of the first motor 150 so that the output torque of the second motor 160 is reduced. Also, when the rotating speed of the second motor 160 is slower than the rotating speed of the first motor 150, the controller 200 may change the d1 axis current of the first motor 150 so that the output torque of the second motor 160 is increased.

Hereinafter, the structure of the controller 200 performing the above-mentioned function will be described.

Figure 11:
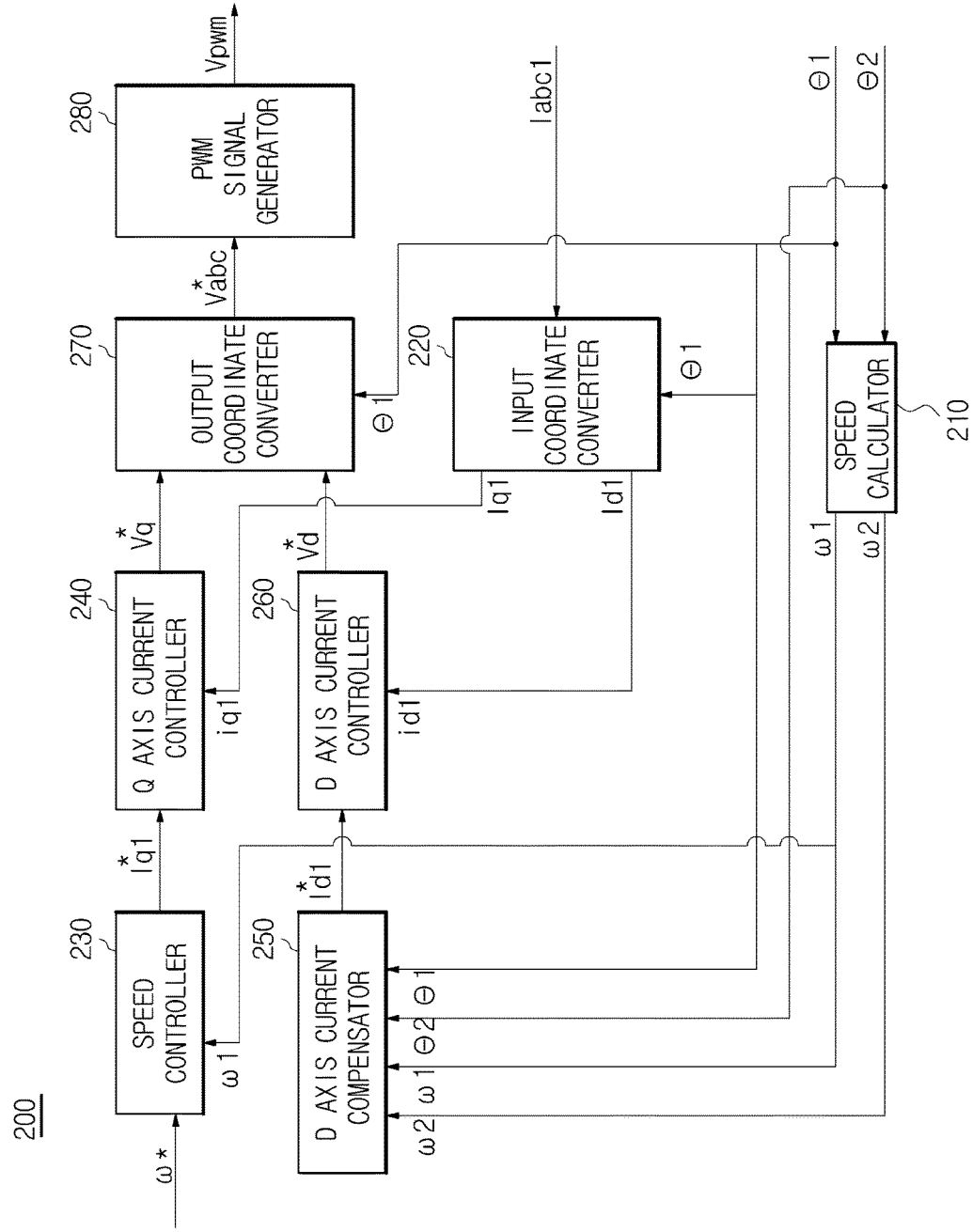
FIG. 11 is a view illustrating an example of a controller included in the power apparatus according to an embodiment of the present disclosure.
Figure 12:
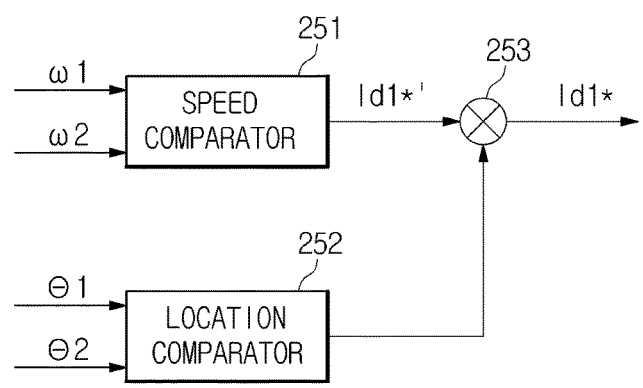
FIG. 12 is a view illustrating an example of a d axis current compensator included in the power apparatus according to an embodiment of the present disclosure.

FIG. 11 is a view illustrating an example of the controller included in the power apparatus according to an embodiment of the present disclosure, and FIG. 12 is a view illustrating an example of a d axis current compensator included in the power apparatus according to an embodiment of the present disclosure.

Referring to FIGS. 11 and 12, the controller 200 includes a speed calculator 210, an input coordinate converter 220, a speed controller 230, a q axis current controller 240, a d axis current compensator 250, a d axis current controller 260, an output coordinate converter 270, and a PWM signal generator 280.

The speed calculator 210 calculates the rotating speed $\omega 1$ of the first motor 150 and the rotating speed $\omega 2$ of the second motor 160 based on a location $\theta 1$ of a first rotor and a location $\theta 2$ of a second rotor detected by the first and second location detectors 170 and 180 (referring to FIG. 1).

The input coordinate converter 220 converts the a, b and c-phase currents detected by the first and second current detectors 130 and 140 (referring to FIG. 1) into the d axis current and the q axis current based on the location $\theta 1$ of the first rotor and the location $\theta 2$ of the second rotor.

The speed controller 230 compares a speed command $\omega^*$ input from an outside with the rotating speed $\omega 1$ of the first motor 150, and outputs a q axis current command Iq* depending on a result of the comparing. The speed controller 230 may include a proportional controller P, a proportional integral controller PI or a proportional integral derivative controller PID.

The q axis current controller 240 compares a q axis current command Iq* output from the speed controller 230 with the q axis current Iq1 of the first motor 150, and outputs a q axis voltage command Vq* depending on a result of the comparing. The q axis current controller 240 may also include the proportional controller, the proportional integral controller or the proportional integral derivative controller.

The d axis current compensator 250 outputs a d axis current command Id* based on the rotating speed $\omega 1$ of the first motor 150, the rotating speed $\omega 2$ of the second motor 160, the location $\theta 1$ of the first rotor and the location $\theta 2$ of the second rotor.

Specifically, the d axis current compensator 250 includes a speed comparator 251 which compares the rotating speed $\omega 1$ of the first motor 150 with the rotating speed $\omega 2$ of the second motor 160 and outputs a preliminary d axis current command Id1*' depending on a result of the comparing, and a location comparator 252 which compares the location $\theta 1$ of the first rotor with the location $\theta 2$ of the second rotor, and outputs +1 or −1 depending on a result of the comparing. Also, the d axis current compensator 250 includes a multiplier 253 which multiplies an output of the speed comparator 251 by an output of the location comparator 252.

The speed comparator 251 outputs the preliminary d axis current command Id1*' so that a difference between the rotating speed $\omega 1$ of the first motor 150 and the rotating speed $\omega 2$ of the second motor 160 is "0".

The speed comparator 251 as described above may employ the proportional controller or the proportional integral controller.

The location comparator 252 outputs +1 or −1 depending on a difference between the location $\theta 1$ of the first rotor and the location $\theta 2$ of the second rotor, but the present disclosure is not limited thereto. The location comparator 252 may output +K (an arbitrary value) or −K (an arbitrary value) depending on a difference between the location $\theta 1$ of the first rotor and the location $\theta 2$ of the second rotor.

Further, the location comparator 252 may output +1 or −1 when the difference between the location $\theta 1$ of the first rotor and the location $\theta 2$ of the second rotor is greater than a reference value, and may output a value proportional to the difference between the location $\theta 1$ of the first rotor and the location $\theta 2$ of the second rotor is less than the reference value when the difference between the location $\theta 1$ of the first rotor and the location $\theta 2$ of the second rotor is less than the reference value.

The multiplier 253 multiplies the preliminary d axis current command Id1*' by the output of the location comparator 252 so that the location $\theta 1$ of the first rotor and the location $\theta 2$ of the second rotor are reflected to the preliminary d axis current command Id1*'.

As a result, the d axis current compensator 250 generates the d axis current command Id1* based on the difference between the rotating speed $\omega 1$ of the first motor 150 and the rotating speed $\omega 2$ of the second motor 160 and the difference between the location $\theta 1$ of the first rotor and the location $\theta 2$ of the second rotor.

The d axis current compensator 250 of the power apparatus 100 according to an embodiment generates the d axis current command Id1* based on the difference between the rotating speed $\omega 1$ of the first motor 150 and the rotating speed $\omega 2$ of the second motor 160, but the present disclosure is not limited thereto. For example, since the rotating speed $\omega 1$ of the first motor 150 follows the speed command $\omega^*$, the d axis current compensator 250 may generate the d axis current command Id1* based on a difference between the speed command ω* and the rotating speed ω2 of the second motor 160.

The d axis current controller 260 compares a d axis current command Id* output from the d axis current compensator 250 with the d axis current Id1 of the first motor 150, and outputs a d axis voltage command Vd* depending on a result of the comparing. The d axis current controller 260 may also include the proportional controller, the proportional integral controller or the proportional integral derivative controller.

The output coordinate converter 270 converts the d axis voltage command Vd* and the q axis voltage command Vq* into a, b and c-phase voltage commands Vabc* based on the location θ1 of the first rotor and the location θ2 of the second rotor.

The PWM signal generator 280 generates the control signal VPWM to be applied to the driver 120, based on the a, b and c-phase voltage commands Vabc*. Specifically, the PWM signal generator 280 performs pulse width modulation (PWM) on each a, b and c-phase voltage command Vabc*, and generates the control signals VPWM which turn on or off the plurality of switching circuits S11 to S13 and S21 to S23.

Figure 13:
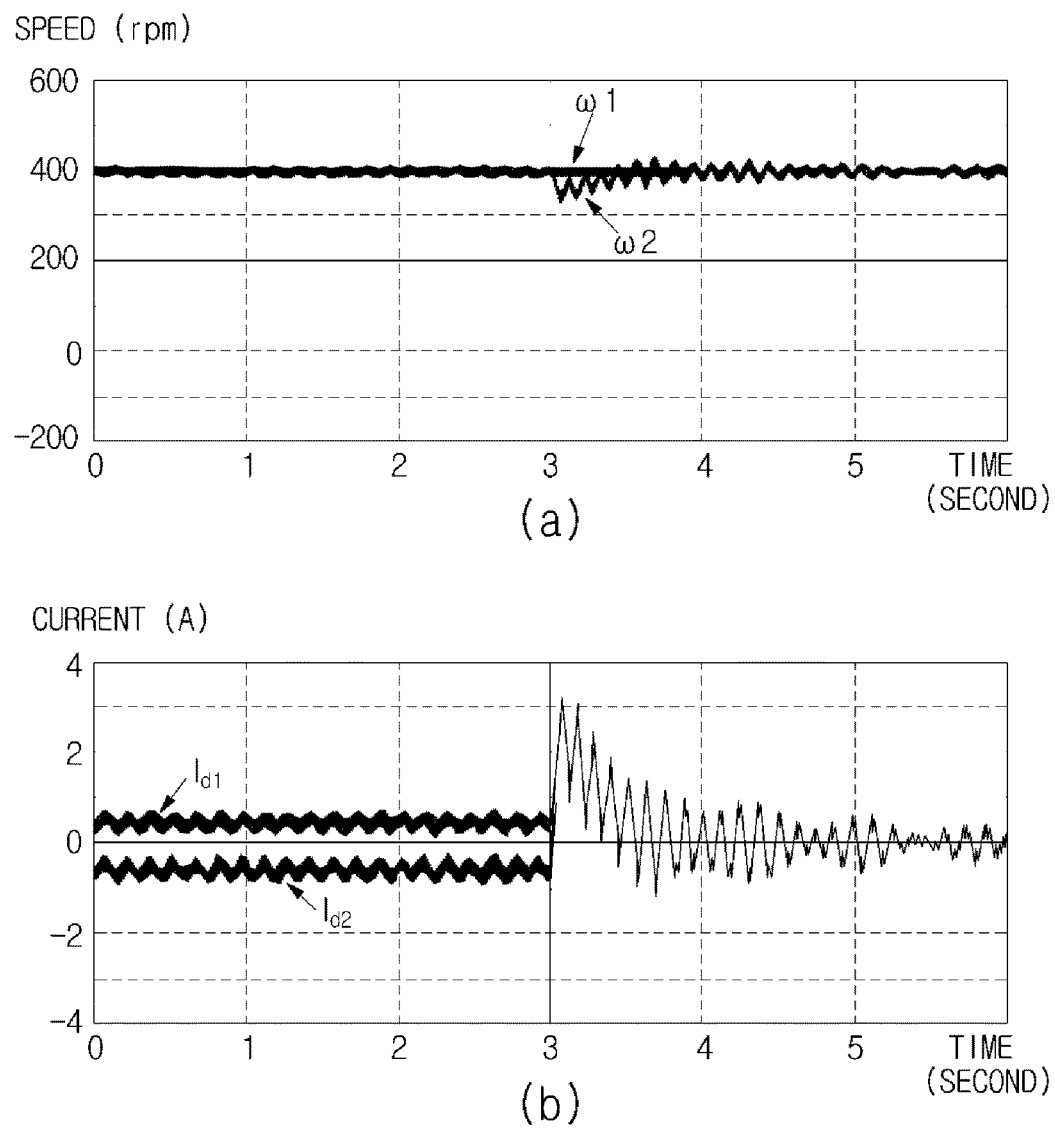
FIG. 13 is a view illustrating d axis currents and rotating speeds of the first and second motors included in the power apparatus according to an embodiment of the present disclosure.

FIG. 13 is a view illustrating the d axis currents and the rotating speeds of the first and second motors included in the power apparatus according to an embodiment of the present disclosure.

FIG. 13 will be briefly explained. A load change occurs at 3 seconds, and FIG. 13A illustrates the rotating speed ω1 of the first motor 150 and the rotating speed ω2 of the second motor 160 before and after the load change, and FIG. 13B illustrates the d axis current Id1 of the first motor 150 and the d axis current Id2 of the second motor 160 before and after the load change.

Referring to FIGS. 13A and 13B, the first and second motors 150 and 160 are operated at the same speed for 3 seconds after the operation, and the d axis currents Id1 and Id2 of the first and second motors 150 and 160 have a value of almost "0".

At 3 seconds after the operation, if the load of the second motor 160 is increased, the rotating speed ω2 of the second motor 160 is sharply reduced.

Also, the d axis current Id1 of the first motor 150 is sharply increased. That is, when the rotating speed ω1 of the first motor 150 and the rotating speed ω2 of the second motor 160 are different from each other, the controller 200 immediately increases the d axis current Id1 of the first motor 150. Thus, the d axis current Id2 of the second motor 160 is also increased along with the d axis current Id1 of the first motor 150.

The output torque of the second motor 160 is increased, and the rotating speed ω2 of the second motor 160 is gradually increased according to the d axis current Id1 of the first motor 150, and then becomes the same as the rotating speed ω1 of the first motor 150.

Also, as the rotating speed ω2 of the second motor 160 is gradually increased, the d axis current Id1 of the first motor 150 is gradually reduced.

When the load of the first motor 150 and the load of the second motor 160 are the same as each other, as described above, the d axis currents Id1 and Id2 are minimized, and the output torques of the first and second motors 150 and 160 may be controlled by the q axis currents Iq1a and Iq2. Further, since the d axis currents Id1 and Id2 may be minimized, power losses in the first and second motors 150 and 160 may be minimized.

When the load of the first motor 150 and the load of the second motor 160 are different from each other, the q axis current, i.e., the output torque of the second motor 160 is controlled using the d axis current supplied to the first motor 150. Therefore, power in which the first motor 150 and the second motor 160 consume may be changed according to selection of the d axis current of the first motor 150 and the d axis current of the second motor 160.

Hereinafter, a method of selecting the dq axis current minimizing the losses when the load of the first motor 150 and the load of the second motor 160 are different from each other will be described.

Since the first and second motors 150 and 160 are connected in parallel with each other, the driving voltage applied to the first motor 150 is the same as that applied to the second motor 160. Equation 3 may be induced from Equation 1 using the fact that the driving voltage applied to the first motor 150 and the driving voltage applied to the second motor 160 are the same as each other.

$$V^2 = V_{d1}^2 + V_{q1}^2 \quad \text{[Equation 3]}$$
$$= V_{d2}^2 + V_{q2}^2$$
$$= (R_S I_{d1} - \omega_r L_S I_{q1})^2 + [R_S I_{q1} + \omega_r (\lambda_f + L_S I_{d1})]^2$$
$$= (R_S I_{d2} - \omega_r L_S I_{q2})^2 + [R_S I_{q2} + \omega_r (\lambda_f + L_S I_{d2})]^2$$

(wherein V is the dq voltage applied to the first and second motors, Vd1 is the d axis voltage of the first motor, Vq1 is the q axis voltage of the first motor, Vd2 is the d axis voltage of the second motor, Vq2 is the q axis voltage of the second motor, Rs is the resistance of the coil included in the stator, Ls is the inductance of the coil included in the stator, λf is the magnetic flux of the permanent magnet included in the rotor, ωr is the rotating speed of the rotator, Id1 is the d axis current of the first motor, Iq1 is the q axis current of the first motor, Id2 is the d axis current of the second motor, and Iq2 is the q axis current of the second motor.)

In Equation 3, to generate the output torque corresponding to the load, the q axis current Iq1 of the first motor 150 and the q axis current Iq2 of the second motor 160 are difficult to be changed. In comparison, the d axis current Id1 of the first motor 150 and the d axis current Id2 of the second motor 160 may be changed within a range in which the first and second motors 150 and 160 have the same rotating speed.

Here, to check a relationship between the d axis current Id1 of the first motor 150 and the d axis current Id2 of the second motor 160, the following Equation 4 may be induced from Equation 3.

$$\left[I_{d1} + \frac{\beta}{2\alpha}\right]^2 - \left[I_{d2} + \frac{\beta}{2\alpha}\right]^2 = \frac{\gamma_2 - \gamma_1}{\alpha} \quad \text{[Equation 4]}$$
$$(\alpha = R_S^2 + \omega_r^2 L_S^2, \beta = 2\omega_r^2 \lambda_f L_S,$$
$$\gamma_1 = (R_S^2 + \omega_r^2 L_S^2)I_{q1}^2 + 2R_S \omega_r \lambda_f I_{q1} + \omega_r^2 \lambda_f^2,$$
$$\gamma_2 = (R_S^2 + \omega_r^2 L_S^2)I_{q2}^2 + 2R_S \omega_r \lambda_f I_{q2} + \omega_r^2 \lambda_f^2)$$

(wherein Id1 is the d axis current of the first motor, Iq1 is the q axis current of the first motor, Id2 is the d axis current of the second motor, Iq2 is the q axis current of the second motor, Rs is the resistance of the coil included in the stator, Ls is the inductance of the coil included in the stator, λf is the magnetic flux of the permanent magnet included in the rotor, and ωr is the rotating speed of the rotator.)

In other words, when the first and second motors 150 and 160 are connected in parallel with each other, and the rotating speeds of the first and second motors 150 and 160 are the same as each other, the d axis current Id1 of the first motor 150 and the d axis current Id2 of the second motor 160 have the relationship of Equation 4.

At this time, the losses of the first and second motors 150 and 160 may be expressed by Equation 5.

$$P_{copper} = 3/2 R_S (I_{d1}^2 + I_{q1}^2 + I_{d2}^2 + I_{q2}^2) \quad \text{[Equation 5]:}$$

(wherein Pcopper is conduction loss in each of the first and second motors, Rs is the resistance of the coil included in the stator, Id1 is the d axis current of the first motor, Iq1 is the q axis current of the first motor, Id2 is the d axis current of the second motor, and Iq2 is the q axis current of the second motor.)

As described above, to generate the output torque corresponding to the load, the q axis current Iq1 of the first motor 150 and the q axis current Iq2 of the second motor 160 are difficult to change. Therefore, to minimize the losses of the first and second motors 150 and 160, (Id1$^2$+Id2$^2$) should be minimized.

In brief, when the rotating speeds of the first and second motors 150 and 160 are the same, the d axis current Id1 of the first motor 150 and the d axis current Id2 of the second motor 160 have the relationship of Equation 4, and the (Id1$^2$+Id2$^2$) should be minimized to minimize the losses of the first and second motors 150 and 160.

According to Equation 4, the d axis current Id1 of the first motor 150 and the d axis current Id2 of the second motor 160 have a hyperbolic relationship. At this time, when a circle formed by the (Id1$^2$+Id2$^2$) is in contact with a hyperbolic curve formed by Equation 4, a value of the (Id1$^2$+Id2$^2$) is minimized.

As described above, when the circle formed by the (Id1$^2$+Id2$^2$) is in contact with the hyperbolic curve formed by Equation 4, the d axis current Id1 of the first motor 150 and the d axis current Id2 of the second motor 160 have the relationship of Equation 6.

$$\frac{1}{I_{d1}} + \frac{1}{I_{d2}} = -\frac{4\alpha}{\beta} \quad \text{[Equation 6]}$$

$$(\alpha = R_S^2 + \omega_r^2 L_S^2, \beta = 2\omega_r^2 \lambda_f L_S)$$

(wherein Id1 is the d axis current of the first motor, Id2 is the d axis current of the second motor, Rs is the resistance of the coil included in the stator, Ls is the inductance of the coil included in the stator, λf is the magnetic flux of the permanent magnet included in the rotor, and ωr is the rotating speed of the rotator.)

Therefore, at intersection points between Equation 4 and Equation 6, the rotating speeds of the first and second motors 150 and 160 are the same as each other, and the d axis current Id1 of the first motor 150 and the d axis current Id2 of the second motor 160 in which the losses of the first and second motors 150 and 160 are minimized is obtained.

Figure 14:
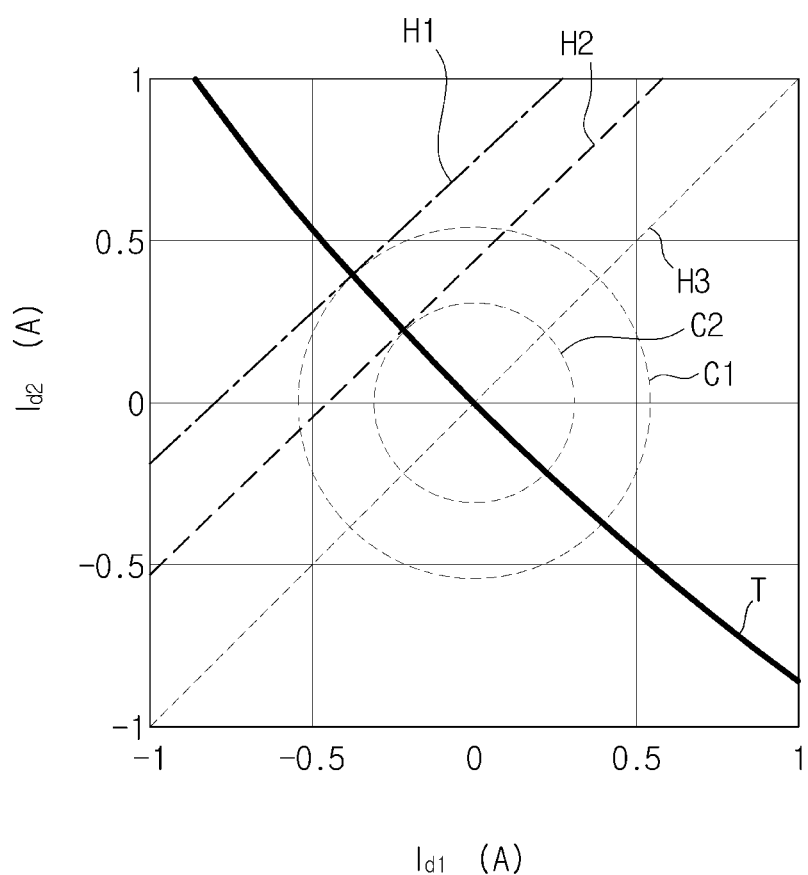
FIG. 14 is a graph for calculating the d axis current which minimizes losses of the first and second motors included in the power apparatus according to an embodiment of the present disclosure.

FIG. 14 is a graph for calculating the d axis current which minimizes the losses of the first and second motors included in the power apparatus according to an embodiment of the present disclosure.

Here, H1 of FIG. 14 illustrates a relationship between the d axis current Id1 of the first motor 150 and the d axis current Id2 of the second motor 160 by Equation 4 when the load of the second motor 160 with respect to the load of the first motor 150 is 0%, i.e., when the load of the second motor 160 is "0". H2 of FIG. 14 illustrates the relationship between the d axis current Id1 of the first motor 150 and the d axis current Id2 of the second motor 160 by Equation 4 when the load of the second motor 160 with respect to the load of the first motor 150 is 50%. H3 of FIG. 14 illustrates a relationship between the d axis current Id1 of the first motor 150 and the d axis current Id2 of the second motor 160 by Equation 4 when the load of the second motor 160 with respect to the load of the first motor 150 is 100%, i.e., when the load of the second motor 160 is the same as the load of the first motor 150.

Further, C1 of FIG. 14 illustrates a circle formed by the (Id1$^2$+Id2$^2$) which is in contact with H1, and C2 of FIG. 14 illustrates the circle formed by the (Id1$^2$+Id2$^2$) which is in contact with H2.

Also, T of FIG. 14 illustrates the intersection points when H1, H2 and H3 are in contact with the circle formed by the (Id1$^2$+Id2$^2$). That is, T illustrates the d axis current Id1 of the first motor 150 and the d axis current Id2 of the second motor 160 which have a relationship as set forth in Equation 6.

Referring to FIG. 14, in the case in which the load of the second motor 160 is the same as the load of the first motor 150, when the d axis current corresponding to the intersection point between H3 and T is input, the losses of the first and second motors 150 and 160 are minimized. That is, when the d axis current Id1 of the first motor 150 is "0", and the d axis current Id2 of the second motor 160 is "0", the losses are minimum.

Further, in the case in which the load of the second motor 160 is half the load of the first motor 150, when the d axis current corresponding to the intersection point between H2 and T is input, the losses of the first and second motors 150 and 160 are minimized. That is, when the d axis current Id1 of the first motor 150 is −0.2 A, and the d axis current Id2 of the second motor 160 is +0.2 A, the losses are minimum.

Also, in the case in which the second motor 160 is in a no-load state, when the d axis current corresponding to the intersection point between H1 and T is input, the losses of the first and second motors 150 and 160 are minimized. That is, when the d axis current Id1 of the first motor 150 is −0.4 A, and the d axis current Id2 of the second motor 160 is +0.4 A, the losses are minimum.

Hereinafter, a structure of the controller performing the above-mentioned function will be described.

Figure 15:
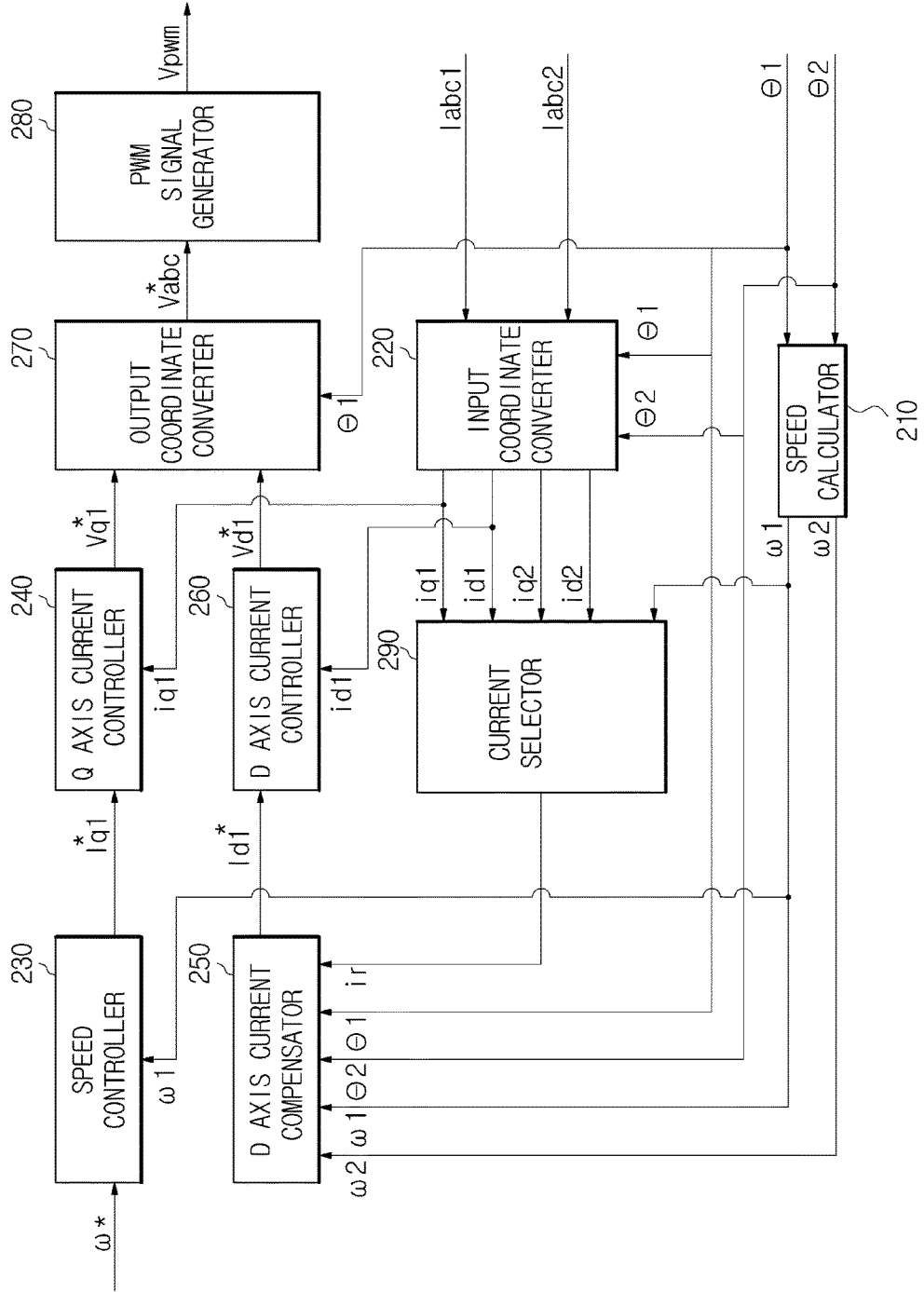
FIG. 15 is a view illustrating another example of the controller included in the power apparatus according to an embodiment of the present disclosure.
Figure 16:
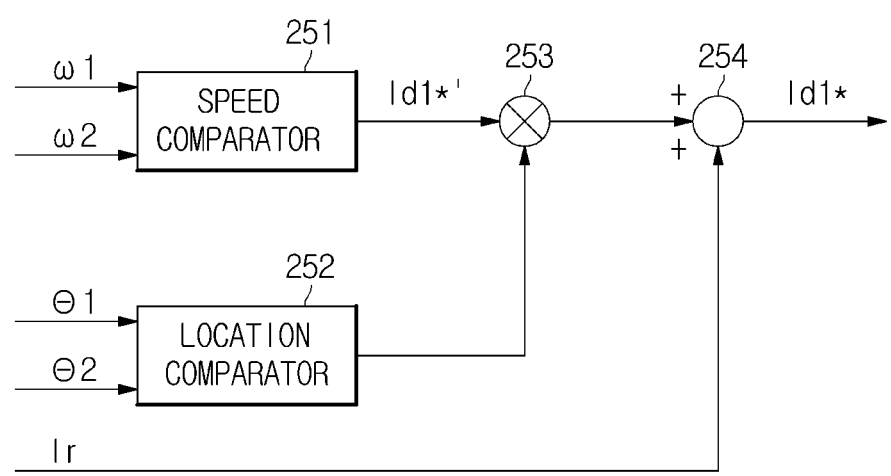
FIG. 16 is a view illustrating another example of the d axis current compensator included in the power apparatus according to an embodiment of the present disclosure.

FIG. 15 is a view illustrating another example of the controller included in the power apparatus according to an embodiment of the present disclosure, and FIG. 16 is a view illustrating another example of the d axis current compensator included in the power apparatus according to an embodiment of the present disclosure. In FIGS. 15 and 16, the same structures as those of the controller 200 illustrated in FIGS. 11 and 12 have the same reference numerals as those in FIGS. 11 and 12.

Referring to FIGS. 15 and 16, the controller 200 may include, for example, a speed calculator 210, an input coordinate converter 220, a speed controller 230, a q axis current controller 240, a d axis current compensator 250, a d axis current controller 260, an output coordinate converter 270, a PWM signal generator 280, and a d axis current selector 290.

Since the speed calculator 210, the input coordinate converter 220, the speed controller 230, the q axis current controller 240, the d axis current controller 260, the output coordinate converter 270 and the PWM signal generator 280 have been already described above, further descriptions thereof will be omitted.

As described above, the d axis current selector 290 outputs the optimal d axis current Ir which may minimize the losses of the first and second motors 150 and 160 based on the d axis current Id1 and q axis current Iq1 of the first motor 150, the d axis current Id1 and q axis current Iq1 of the second motor 160, and the rotating speed ω1 of the first motor 150.

The d axis current selector 290 may include a lookup table which outputs an predetermined optimal d axis current Ir according to the d axis current Id1 and the q axis current Iq1 of the first motor 150, the d axis current Id2 and the q axis current Iq2 of the second motor 160, and the rotating speed of the first motor 150. In addition, the d axis current selector 290 may directly output the optimal d axis current Ir from the d axis current Id1 and the q axis current Iq1 of the first motor 150, the d axis current Id2 and the q axis current Iq2 of the second motor 160, and the rotating speed of the first motor 150 using a bisection method or the like.

The d axis current compensator 250 may further include, for example, a speed comparator 251, a location comparator 252, a multiplier 253 and an adder 254.

The adder 254 outputs a sum of an output of the multiplier 253 and the optimal d axis current Ir.

As described above, the speed comparator 251 may employ the proportional controller (P controller) or the proportional integral controller (PI controller). The proportional controller or the proportional integral controller may immediately compensate for the d axis current of the first motor 150 when a deviation between the rotating speed ω1 of the first motor 150 and the rotating speed ω2 of the second motor 160 is generated.

As described above, when deviation between the rotating speed ω1 of the first motor 150 and the rotating speed ω2 of the second motor 160 is generated, the d axis current compensator 250 immediately outputs the d axis current Id1 to stabilize the rotating speed ω2 of the second motor 160. That is, until the rotating speed ω1 of the first motor 150 and the rotating speed ω2 of the second motor 160 are the same after the deviation between the rotating speed ω1 of the first motor 150 and the rotating speed ω2 of the second motor 160 is generated, the d axis current Id1 output from the d axis current compensator 250 have a dominant position.

When the rotating speed ω1 of the first motor 150 and the rotating speed ω2 of the second motor 160 are the same as each other, the proportional controller outputs "0", and thus a deviation is generated again between rotating speed ω1 of the first motor 150 and the rotating speed ω2 of the second motor 160. To prevent this phenomenon and to minimize the losses the first and second motors 150 and 160, the d axis current selector 290 outputs the optimal d axis current Ir.

When the rotating speed ω1 of the first motor 150 and the rotating speed ω2 of the second motor 160 are the same as each other, the d axis current selector 290 outputs the optimal d axis current Ir which may minimize the losses of the first and second motors 150 and 160. That is, when the rotating speed ω1 of the first motor 150 and the rotating speed ω2 of the second motor 160 are the same after deviation between the rotating speed ω1 of the first motor 150 and the rotating speed ω2 of the second motor 160 is generated, the optimal d axis current Ir output from the d axis current compensator 250 have a dominant position.

Figure 17:
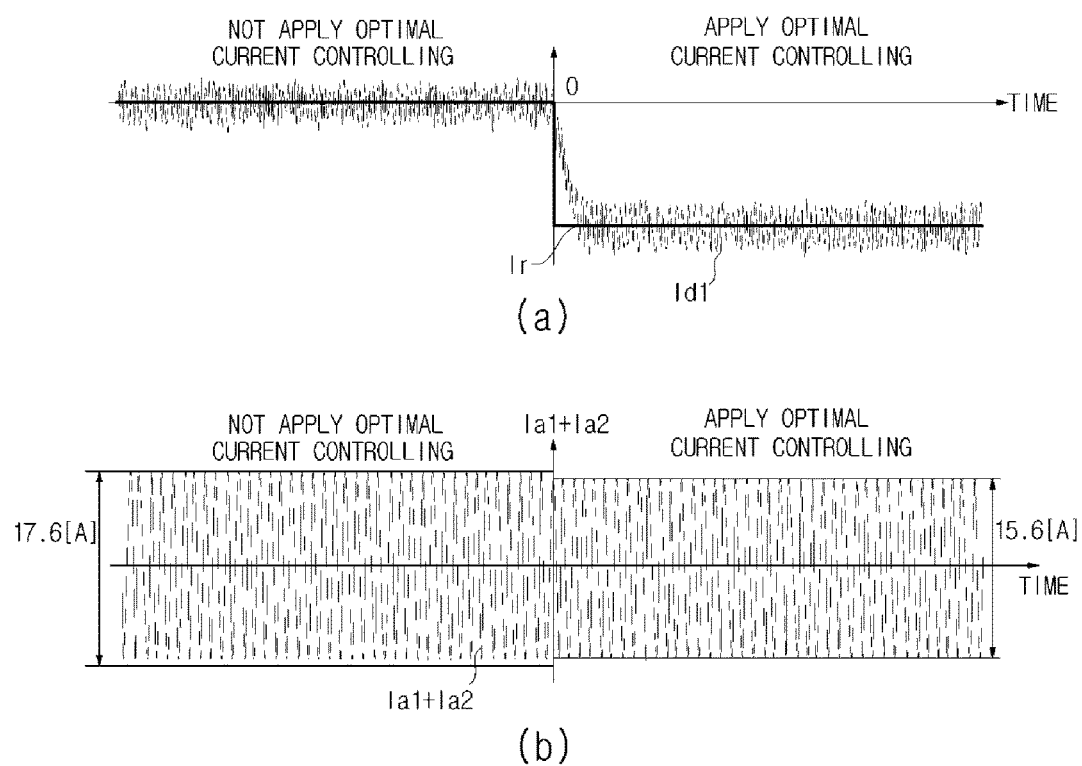
FIG. 17 is a view illustrating a driving current output from the power apparatus according to an embodiment of the present disclosure when an optimal current controlling operation is not performed and when the optimal current controlling operation is performed.

FIG. 17 is a view illustrating the driving current output from the power apparatus according to an embodiment of the present disclosure when an optimal current controlling operation is not performed and when the optimal current controlling operation is performed. Specifically, FIG. 17A illustrates an example of the optimal d axis current Ir and the d axis current Id1 of the first motor 150 when the optimal current controlling operation is not performed and when the optimal current controlling operation is performed, and FIG. 17B illustrates an example of an a-phase current (Ia1+Ia2) supplied to the first and second motors 150 and 160 when the optimal current controlling operation is not performed and when the optimal current controlling operation is performed.

When the optimal current controlling operation for minimizing the losses is not performed, the optimal d axis current Ir is "0 A", as illustrated in FIG. 17A, and thus the d axis current Id1 of the first motor 150 is also vibrated centering on a current value of "0A".

When the optimal current controlling operation is performed, the optimal d axis current Ir may be calculated based on the d axis current Id1 and the q axis current Iq1 of the first motor 150, the d axis current Id2 and the q axis current Iq2 of the second motor 160, and the rotating speed ω1 of the first motor 150. For example, as illustrated in FIG. 17A, an optimal d axis current Ir of 1.4 A may be calculated, and thus the d axis current Id1 of the first motor 150 is vibrated centering on a current value of "1.4 A".

As illustrated in FIG. 17B, an amplitude of the a-phase current (Ia1+Ia2) supplied to the first and second motors 150 and 160 is reduced from 17.6 A to 15.6 A by applying the optimal current controlling. As a result, the losses of the first and second motors 150 and 160 are reduced.

According to an aspect of the present disclosure, the driving voltage can be applied to drive two or more motors at the same speed, based on the rotating speed and the driving current of one of two or more motors, using a single driving apparatus.

According to another aspect of the present disclosure, when the rotating speeds of the two or more motors are different from each other, the driving voltage can be changed based on the difference between the rotating speeds, and the driving current, and thus the two or more motor can be rotated at the same speed.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:
1. A power apparatus comprising:
    a first motor comprising a rotor;
    a second motor comprising a rotor, and connected in parallel with the first motor;
    a single inverter configured to supply driving currents to both the first motor and the second motor;
    a speed calculator configured to calculate a rotating speed of the rotor of the first motor and a rotating speed of the rotor of the second motor; and
    a controller configured to:
        compare the rotating speed of the rotor of the first motor with the rotating speed of the rotor of the second motor and provide a first output based on the comparison of the rotating speed of the rotor of the first motor with the rotating speed of the rotor of the second motor;
        compare a location of the rotor of the first motor with a location of the rotor of the second motor and provide a second output based on the comparison of the location of the rotor of the first motor with the location of the rotor of the second motor;
provide a third output based on the first output and the second output; and
control the single inverter to supply the driving currents according to the third output based on the comparison of the rotating speed of the rotor of the first motor with the rotating speed of the rotor of the second motor and the comparison of the location of the rotor of the first motor with the location of the rotor of the second motor.

2. The power apparatus according to claim 1, wherein the controller controls the single inverter to supply a first driving current when the rotating speed of the rotor of the first motor and the rotating speed of the rotor of the second motor are the same as each other, and controls the single inverter to supply a second driving current when the rotating speed of the rotor of the first motor and the rotating speed of the rotor of the second motor are different from each other.

3. The power apparatus according to claim 2, wherein the first driving current is calculated from the rotating speed of the rotor of the first motor.

4. The power apparatus according to claim 2, wherein the second driving current is calculated from the rotating speed of the rotor of the first motor, a difference between the rotating speed of the rotor of the first motor and the rotating speed of the rotor of the second motor and a difference between the location of the rotor of the first motor and the location of the rotor of the second motor.

5. The power apparatus according to claim 2, wherein the second driving current is calculated from the rotating speed of the rotor of the first motor, the driving current of the first motor and the driving current of the second motor.

6. The power apparatus according to claim 2, wherein each of the rotor of the first motor and the second motor has a permanent magnet.

7. The power apparatus according to claim 6, wherein the driving current supplied to the first motor and the driving current supplied to the second motor each comprise a d axis current in parallel with a magnetic field formed by the permanent magnet and a q axis current perpendicular to the magnetic field formed by the permanent magnet.

8. The power apparatus according to claim 7, wherein the controller calculates a q axis current command from the rotating speed of the rotor of the first motor.

9. The power apparatus according to claim 7, wherein the controller calculates a d axis current command from a difference between the location of the rotor of the first motor and the location of the rotor of the second motor and a difference between the rotating speed of the rotor of the first motor and the rotating speed of the rotor of the second motor.

10. The power apparatus according to claim 7, wherein the controller generates a d axis current command from a difference between the location of the rotor of the first motor and the location of the rotor of the second motor, a difference between the rotating speed of the rotor of the first motor and the rotating speed of the rotor of the second motor, the q axis and d axis currents of the first motor, and the q axis and d axis currents of the second motor.

11. A method of controlling a power apparatus comprising a first motor and a second motor connected in parallel with each other, the first motor and second motor each comprising a rotor, the method comprising:
detecting a driving current of the first motor and a driving current of the second motor;
calculating a rotating speed of the rotor of the first motor and a rotating speed of the rotor of the second motor;
comparing the rotating speed of the rotor of the first motor with the rotating speed of the rotor of the second motor and providing a first output based on the comparison of the rotating speed of the rotor of the first motor with the rotating speed of the rotor of the second motor;
comparing a location of the rotor of the first motor with a location of the rotor of the second motor and providing a second output based on the comparison of the location of the rotor of the first motor with the location of the rotor of the second motor;
processing an input of the first output and an input of the second output to provide a third output, and
supplying, by a single inverter, driving currents to both the first motor and the second motor according to the third output based on the comparison of the rotating speed of the rotor of the first motor with the rotating speed of the rotor of the second motor and the comparison of the location of the rotor of the first motor with the location of the rotor of the second motor.

12. The method according to claim 11, wherein the supplying of the driving currents comprises:
supplying a first driving current according to the rotating speed of the rotor of the first motor when the rotating speed of the rotor of the first motor and the rotating speed of the rotor of the second motor are the same as each other; and
supplying a second driving current according to a difference between the rotating speed of the rotor of the first motor with the rotating speed of the rotor of the second motor and a difference between the location of the rotor of the first motor and the location of the rotor of the second motor when the rotating speed of the rotor of the first motor and the rotating speed of the rotor of the second motor are different from each other.

13. The method according to claim 12, wherein the supplying of the driving currents comprises:
calculating the first driving current from the driving current of the first motor and the rotating speed of the first motor.

14. The method according to claim 12, wherein the supplying of the driving currents comprises:
calculating the second driving current from the rotating speed of the rotor of the first motor, the difference between the rotating speed of the rotor of the first motor and the rotating speed of the second motor, and the difference between the location of the rotor of the first motor and the location of the rotor of the second motor.

15. The method according to claim 12, wherein the supplying of the driving currents comprises:
calculating the second driving current from the rotating speed of the rotor of the first motor, the driving current of the first motor and the driving current of the second motor, so as to minimize a power loss.

16. A motor driving apparatus comprising:
a single inverter to supply driving currents to both a first motor and a second motor connected in parallel with each other, the first motor and the second motor each comprising a rotor;
a current detector configured to detect the driving current of the first motor and the driving current of the second motor;
a speed calculator configured to calculate a rotating speed of the rotor of the first motor and a rotating speed of the rotor of the second motor; and
a controller configured to:

compare the rotating speed of the rotor of the first motor with the rotating speed of the rotor of the second motor and provide a first output based on the comparison of the rotating speed of the rotor of the first motor with the rotating speed of the rotor of the second motor;

compare a location of the rotor of the first motor with a location of the rotor of the second motor and provide a second output based on the comparison of the location of the rotor of the first motor with the location of the rotor of the second motor; and provide a third output based on the first output and the second output; and control the single inverter to supply the driving currents according to a third output based on the comparison of the rotating speed of the rotor of the first motor with the rotating speed of the rotor of the second motor and the comparison of the location of the rotor of the first motor with the location of the rotor of the second motor.

17. The motor driving apparatus according to claim 16, wherein the controller controls the single inverter to supply a first driving current when the rotating speed of the rotor of the first motor and the rotating speed of the rotor of the second motor are the same as each other, and controls the single inverter to supply a second driving current when the rotating speed of the rotor of the first motor and the rotating speed of the rotor of the second motor are different from each other.

18. The motor driving apparatus according to claim 17, wherein the second driving current is calculated from a difference between the rotating speed of the rotor of the first motor and the rotating speed of the rotor of the second motor and a difference between the location of the rotor of the first motor and the location of the rotor of the second motor.

19. The motor driving apparatus according to claim 17, wherein the second driving current is calculated from the driving current of the first motor.

20. A motor driving apparatus comprising:
a first motor comprising a rotor;
a second motor comprising a rotor;
a single inverter configured to supply driving currents to both the first motor and the second motor;
a speed calculator configured to calculate a rotating speed of the rotor of the first motor and a rotating speed of the rotor of the second motor; and
a controller configured to equalize the rotating speed of the rotor of the first motor and the rotating speed of the rotor of the second motor by controlling the driving currents supplied by the single inverter, the controller is configured to:
compare the rotating speed of the rotor of the first motor with the rotating speed of the rotor of the second motor and provide a first output based on the comparison of the rotating speed of the rotor of the first motor with the rotating speed of the rotor of the second motor;
compare a location of the rotor of the first motor with a location of the rotor of the second motor and provide a second output based on the comparison of the location of the rotor of the first motor with the location of the rotor of the second motor; and
provide a third output based on the first output and the second output;
wherein the controller controls the single inverter to supply the driving currents according to the third output based on the comparison of the rotating speed of the rotor of the first motor with the rotating speed of the rotor of the second motor and the comparison of the location of the rotor of the first motor with the location of the rotor of the second motor.

* * * * *